May 1, 1951  A. M. MacFARLAND  2,550,835
PIN SETTING MACHINE

Filed March 22, 1945  13 Sheets-Sheet 1

Inventor
Allison M. MacFarland
By McCanna and Morsbach
Attys

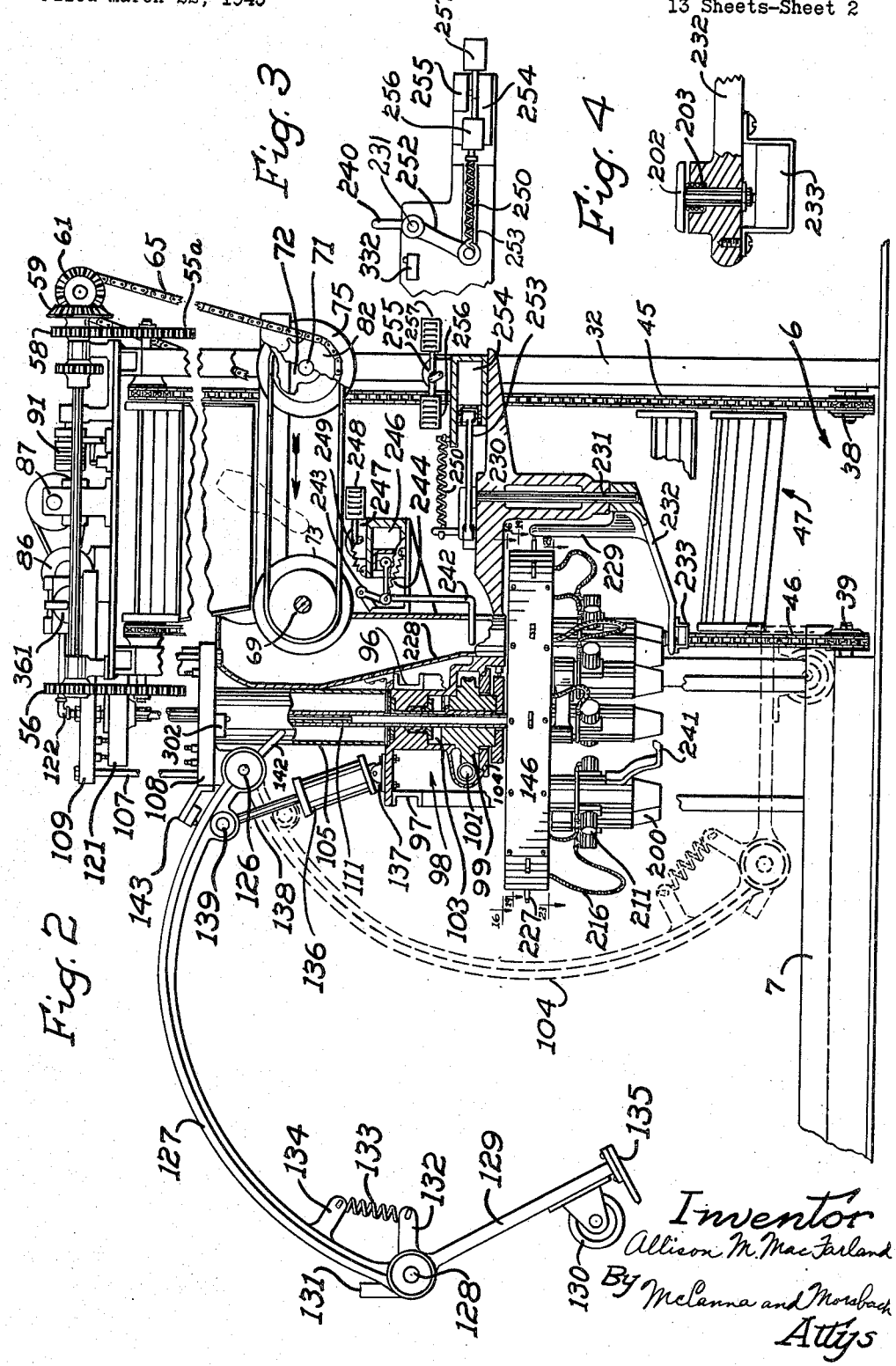

May 1, 1951

A. M. MacFARLAND 2,550,835

PIN SETTING MACHINE

Filed March 22, 1945

Inventor
Allison M. MacFarland
By McCanna and Morsbach
Attys

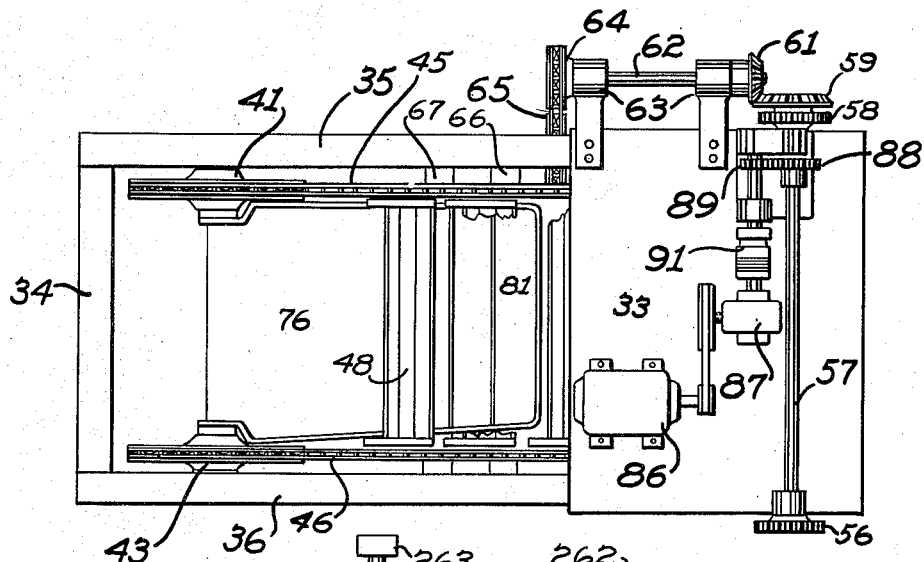

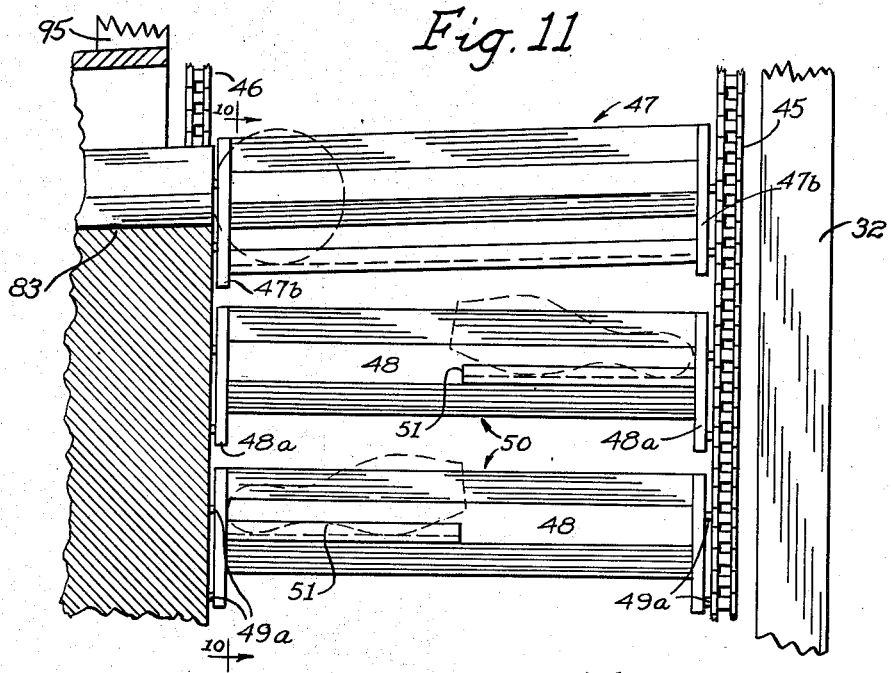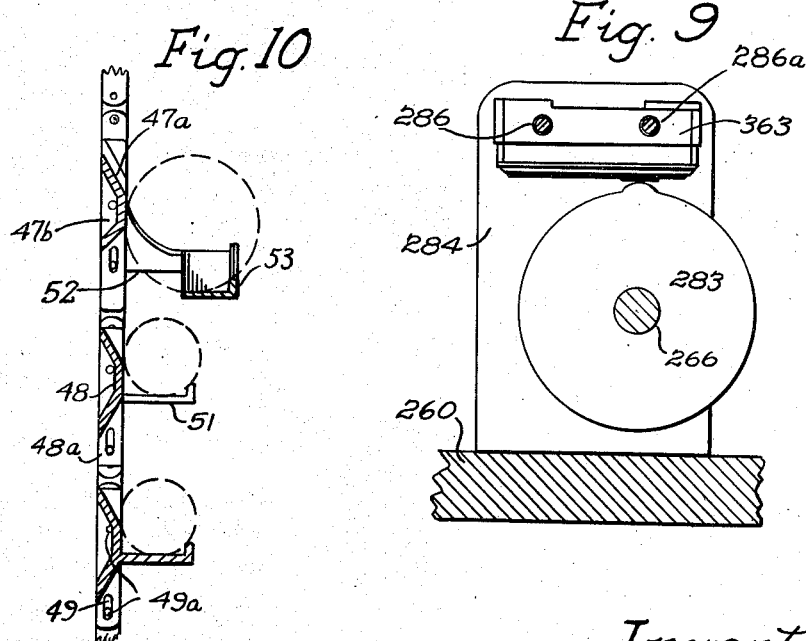

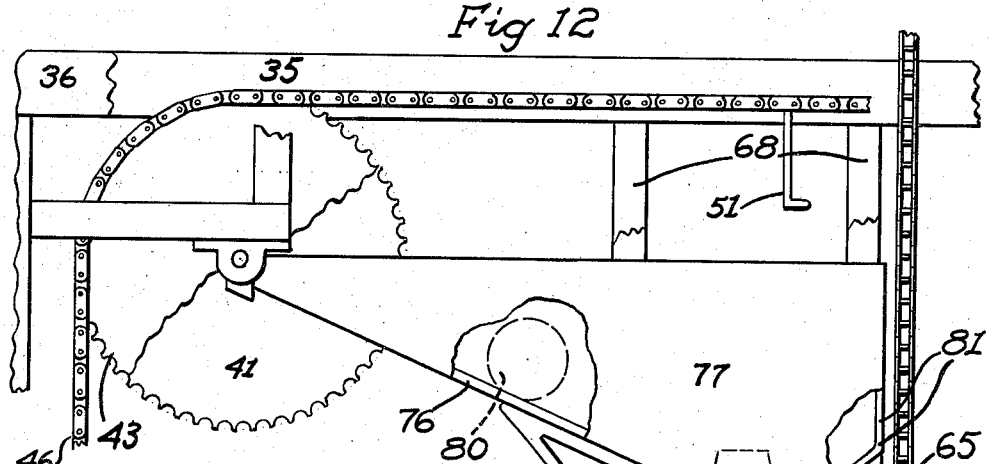
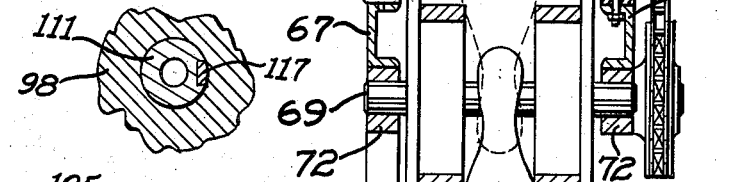
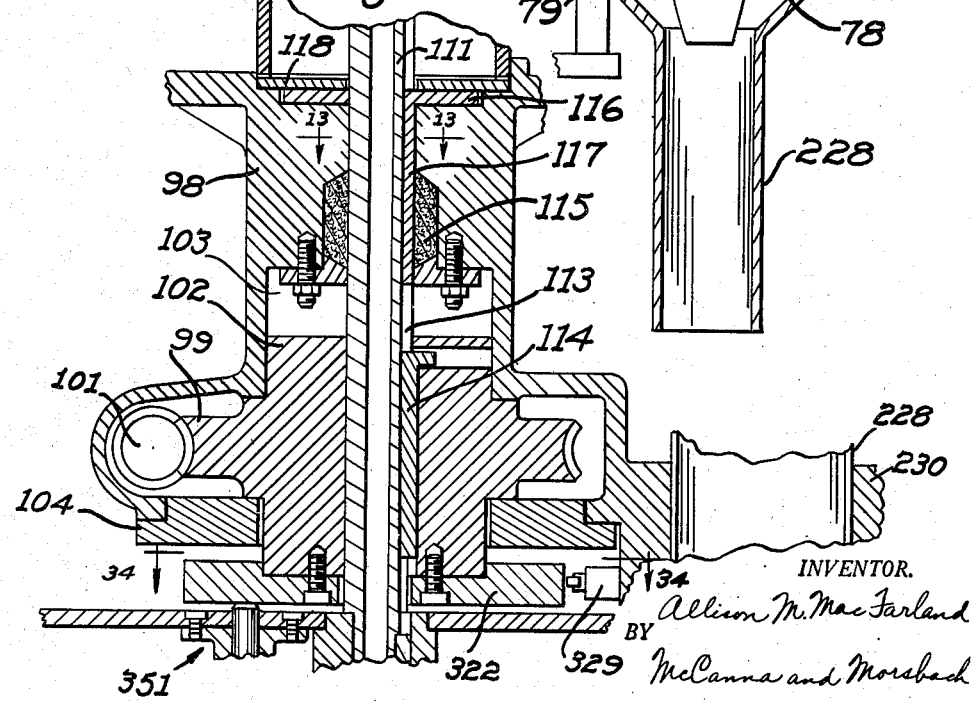

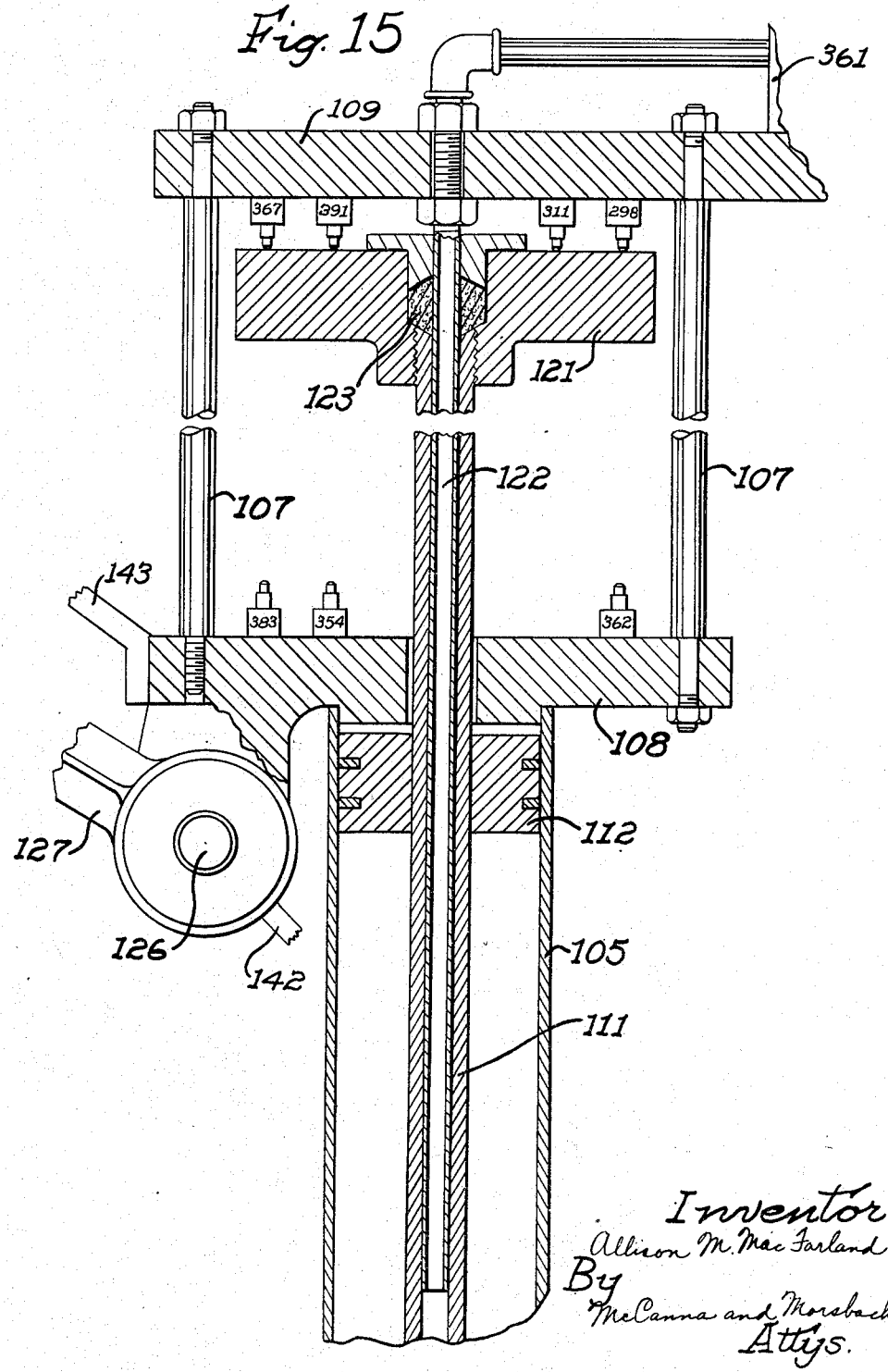

May 1, 1951 A. M. MacFARLAND 2,550,835
PIN SETTING MACHINE
Filed March 22, 1945 13 Sheets-Sheet 8
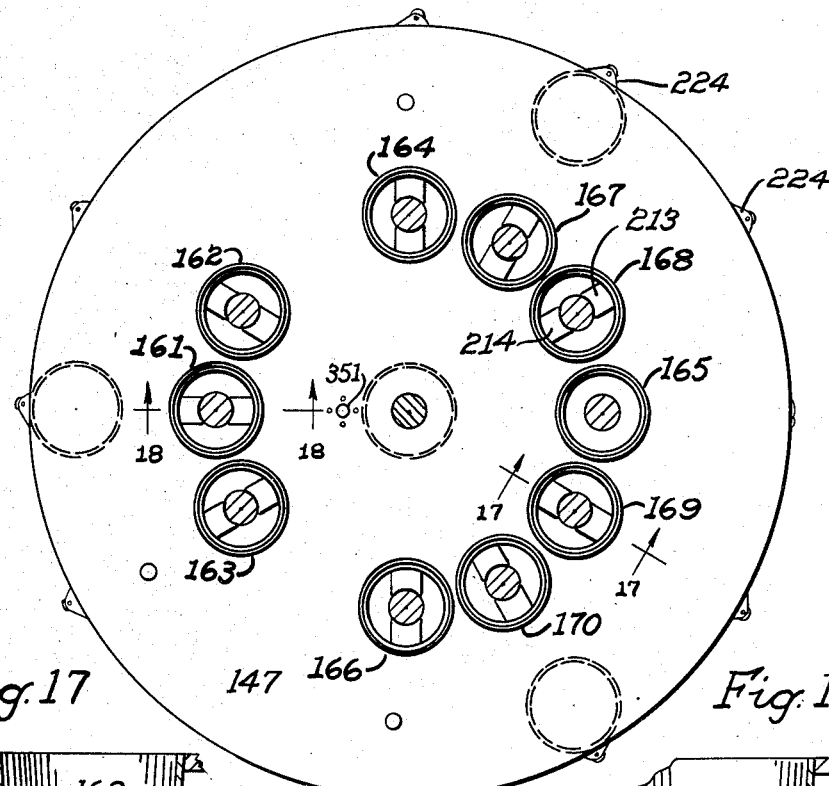
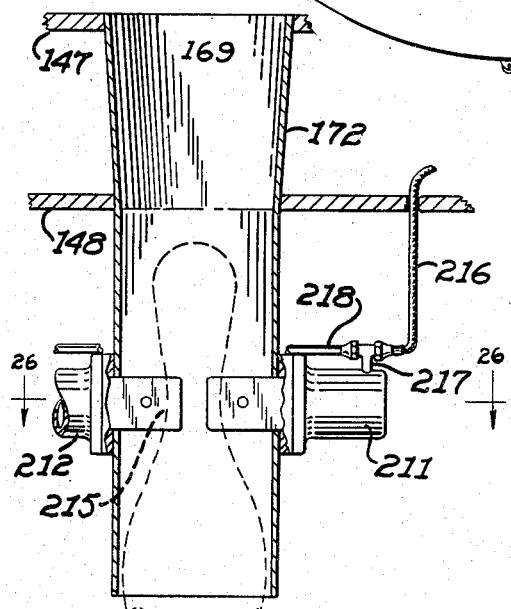
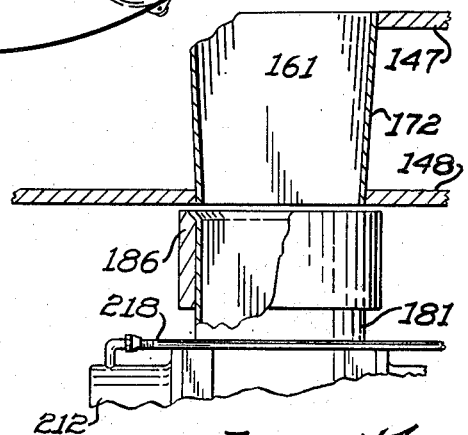
Inventor
Allison M. MacFarland
By McCanna and Morsbach
Attys May 1, 1951   A. M. MacFARLAND   2,550,835
PIN SETTING MACHINE
Filed March 22, 1945   13 Sheets-Sheet 9
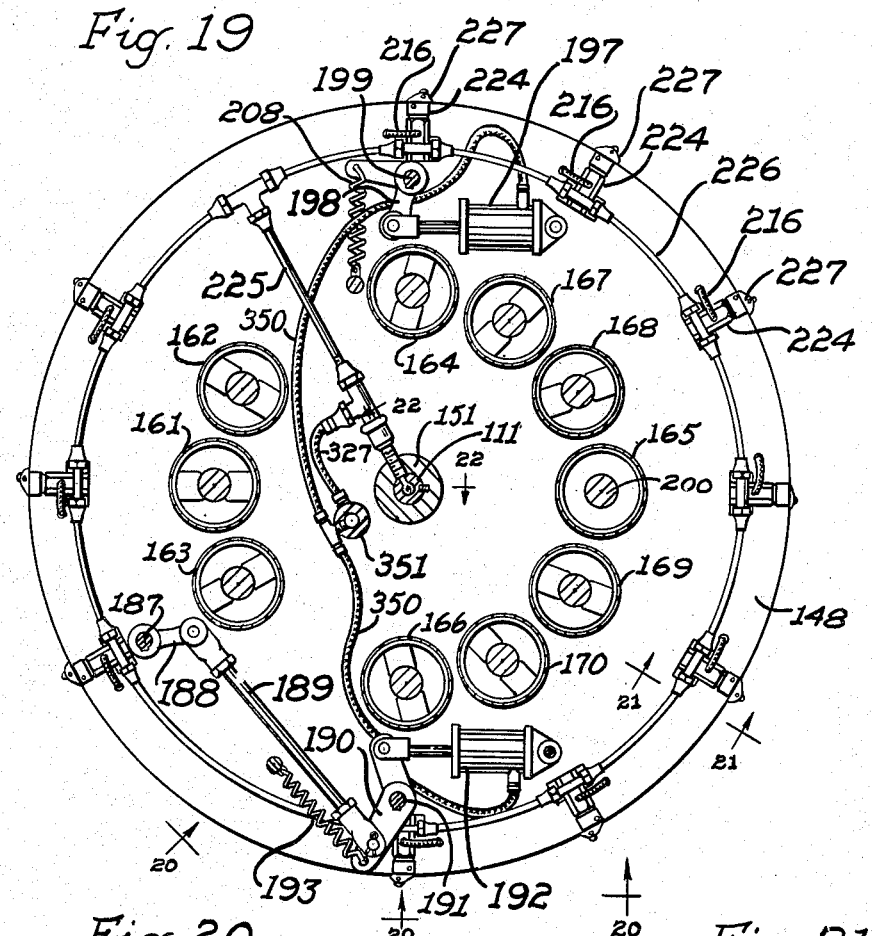
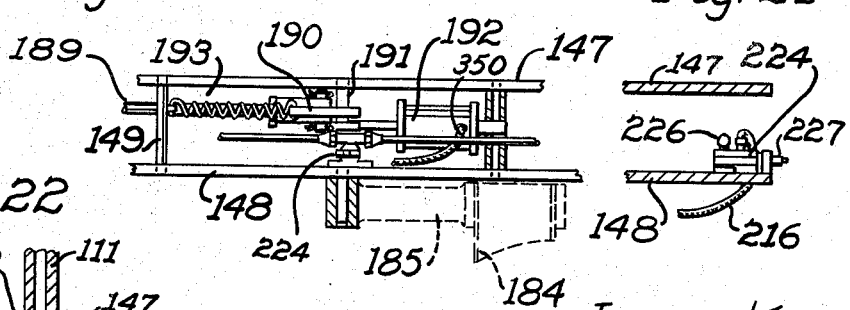
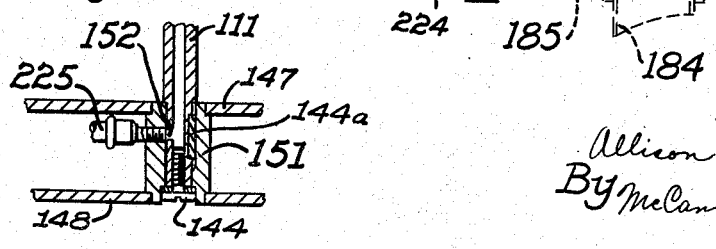
Inventor
Allison M. MacFarland
By McCanna and Morsbach
Attys May 1, 1951     A. M. MacFARLAND     2,550,835
PIN SETTING MACHINE Filed March 22, 1945     13 Sheets—Sheet 10

Inventor
Allison M. MacFarland
By McCanna and Morsbach
Attys

May 1, 1951 A. M. MacFARLAND 2,550,835
PIN SETTING MACHINE
Filed March 22, 1945 13 Sheets-Sheet 11

INVENTOR.
Allison M. MacFarland
BY
McCanna and Morsbach

May 1, 1951          A. M. MacFARLAND          2,550,835
PIN SETTING MACHINE
Filed March 22, 1945                                13 Sheets—Sheet 12
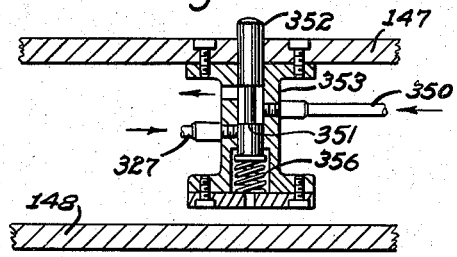
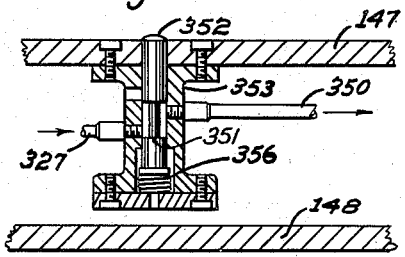
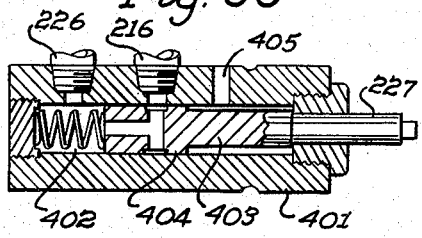
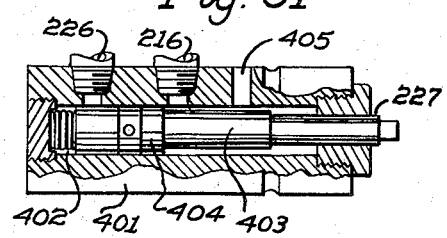
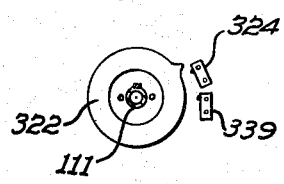
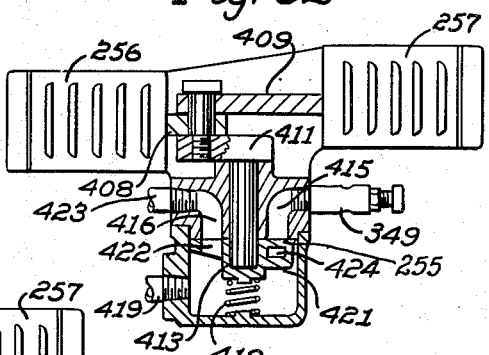
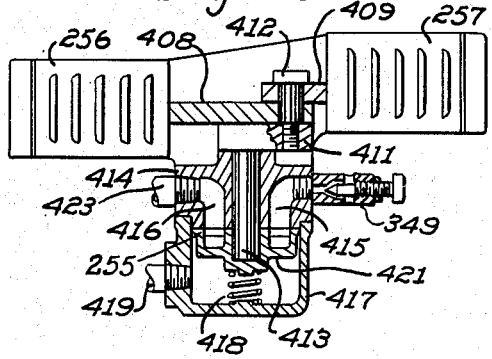
Inventor
Allison M. MacFarland
By McCanna and Morsbach
Attys

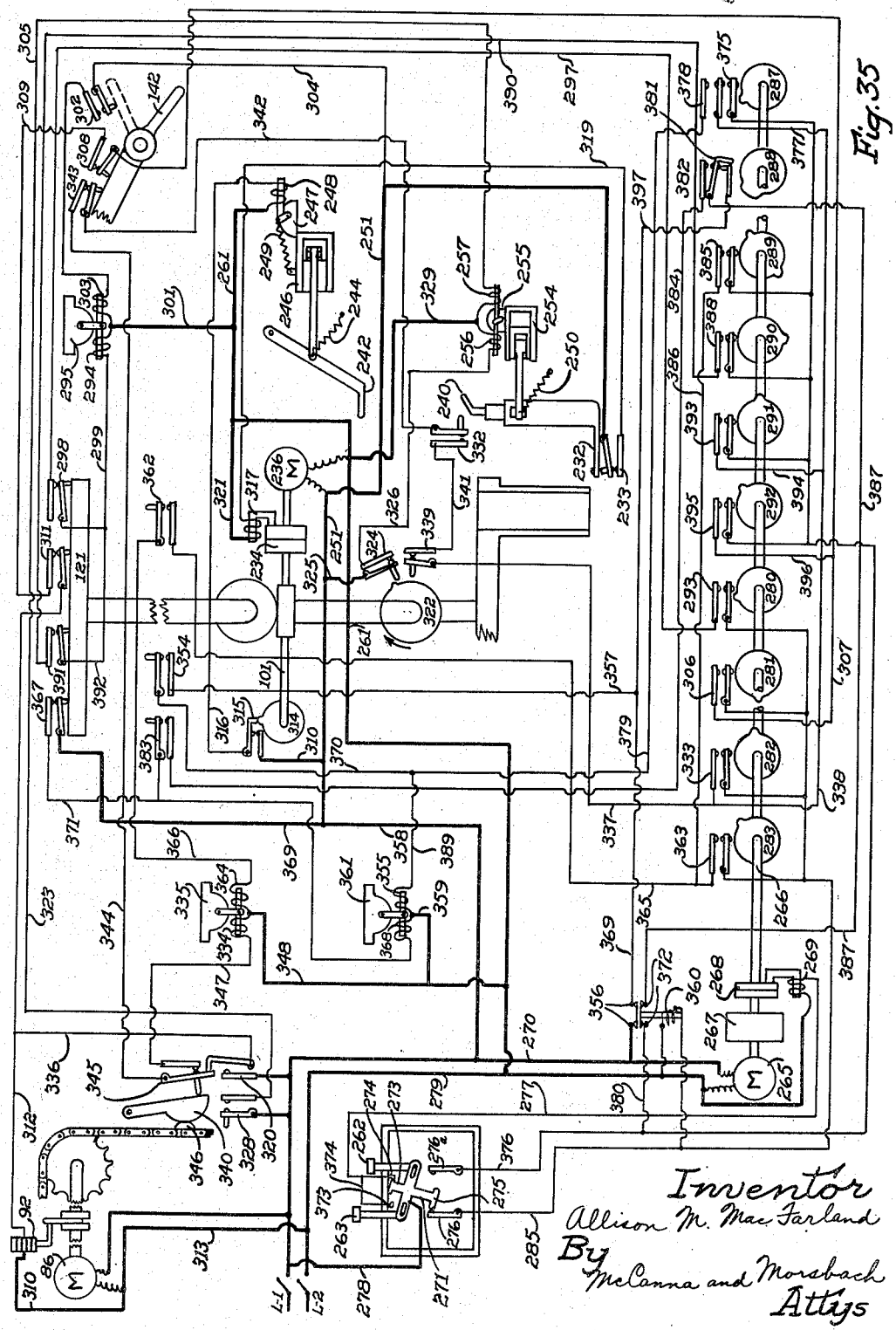

Patented May 1, 1951

2,550,835

UNITED STATES PATENT OFFICE 2,550,835

PIN SETTING MACHINE

Allison M. MacFarland, Freeport, Ill., assignor of one-half to Frank Howard and one-half to William G. Angelos, Freeport, Ill.

Application March 22, 1945, Serial No. 584,175

26 Claims. (Cl. 273—43)

This invention relates to pin setting machines for bowling alleys and has for its general object the provision of an improved machine for resetting the pins.

An important purpose of the invention is the provision of a pin setting machine operative under the control of the player for either resetting all of the pins, or to reset only the pins remaining standing after the ball is rolled.

A further object of the invention is the provision of a pin setting machine having a novel pin rack for storing the pins and for repositioning the pins on the alley.

I have also aimed to provide a pin setting machine wherein the pins are fed in succession into a circular position in the pin rack and the pins are shifted to a triangular position as the pin rack is lowered to seat the pins on the alley.

Another object of the invention is the provision of a pin setting machine having novel means for feeding the pins into the pin rack and for indexing the pin rack to receive successive pins.

I have further aimed to provide a pin setting machine having improved means for driving the same and improved means for controlling the driving means.

A still further object of the invention is the provision of a machine of the character described having improved means for retaining the pins in the pin rack and improved means for controlling the retaining means.

Another important object of the invention is the provision of a pin setter which can be applied to conventional alleys with no substantial change in the alley or building, such, for example, as changes in the floors to provide deeper pits or changes in the alley surface.

Other objects and advantages will appear from the following description and the accompanying drawings, in which—

Fig. 2 is a side elevation thereof partly in section showing the parts in the positions occupied thereby just after deposit of the last pin in the pin rack;

Fig. 3 is a fragmentary top view of the lever mechanism for operating the pin stop;

Fig. 4 is a fragmentary view partly in section showing the pin stop and the switch mechanism associated therewith;

Fig. 5 is a side elevation of the conveyer and transporting mechanism in the rest position thereof taken from the extreme right side of the machine facing Fig. 1;

Fig. 6 is a top view of the conveyer and transporting mechanism showing the drive therefor;

Fig. 7 is a diagrammatic sectional view of the manual control box for controlling the operation of the pin setting mechanism;

Fig. 8 is a view of the program switch mechanism with the cover in section;

Fig. 9 is a sectional view on the line 9—9 of Fig. 8;

Fig. 10 is a fragmentary section through the conveyer mechanism taken on the line 10—10 of Fig. 11;

Fig. 11 is a fragmentary enlarged side view of the conveyer taken substantially along the line 11—11 of Fig. 1 showing the ball shelf approaching a position to discharge the ball onto the ball return track;

Fig. 12 is a fragmentary front elevation partly in section showing the pin feeding mechanism;

Fig. 13 is a fragmentary section on the line 13—13 of Fig. 14;

Fig. 14 is a fragmentary section showing the drive mechanism for rotating the pin rack;

Fig. 15 is a partial section showing the upper end of the pin rack cylinder and the switch operating mechanism associated therewith;

Fig. 16 is a view on the line 16—16 of Figure 2 showing the top side of the pin rack in the position occupied thereby just after the last pin is deposited, the moved positions of the pin tubes being shown in dotted lines;

Fig. 17 is a section substantially on the line 17—17 of Fig. 16 showing the structure of the stationary pin tubes;

Fig. 18 is a section on the line 18—18 of Fig. 16 showing the structure of the movable pin tube 161;

Fig. 19 is a view on the line 19—19 of Figure 2 with the parts occupying the same position as in Fig. 16 and with the shroud removed showing the individual pin grip valves and the lever mechanism for swinging the movable pin tubes;

Fig. 20 is a view taken on the line 20—20 of Fig. 19;

Fig. 21 is a view on the line 21—21 of Fig. 19;

Fig. 22 is a section substantially on the line 22—22 of Fig. 19;

Figs. 28 and 29 are sections through the pin rack plates and through the valve 351 controlling the movement of the movable pin tubes showing the two operative positions thereof;

Figs. 30 and 31 are longitudinal sections through one of the valves 224 for controlling the pin grips, the figures showing the two positions of the valve;

Figure 1:
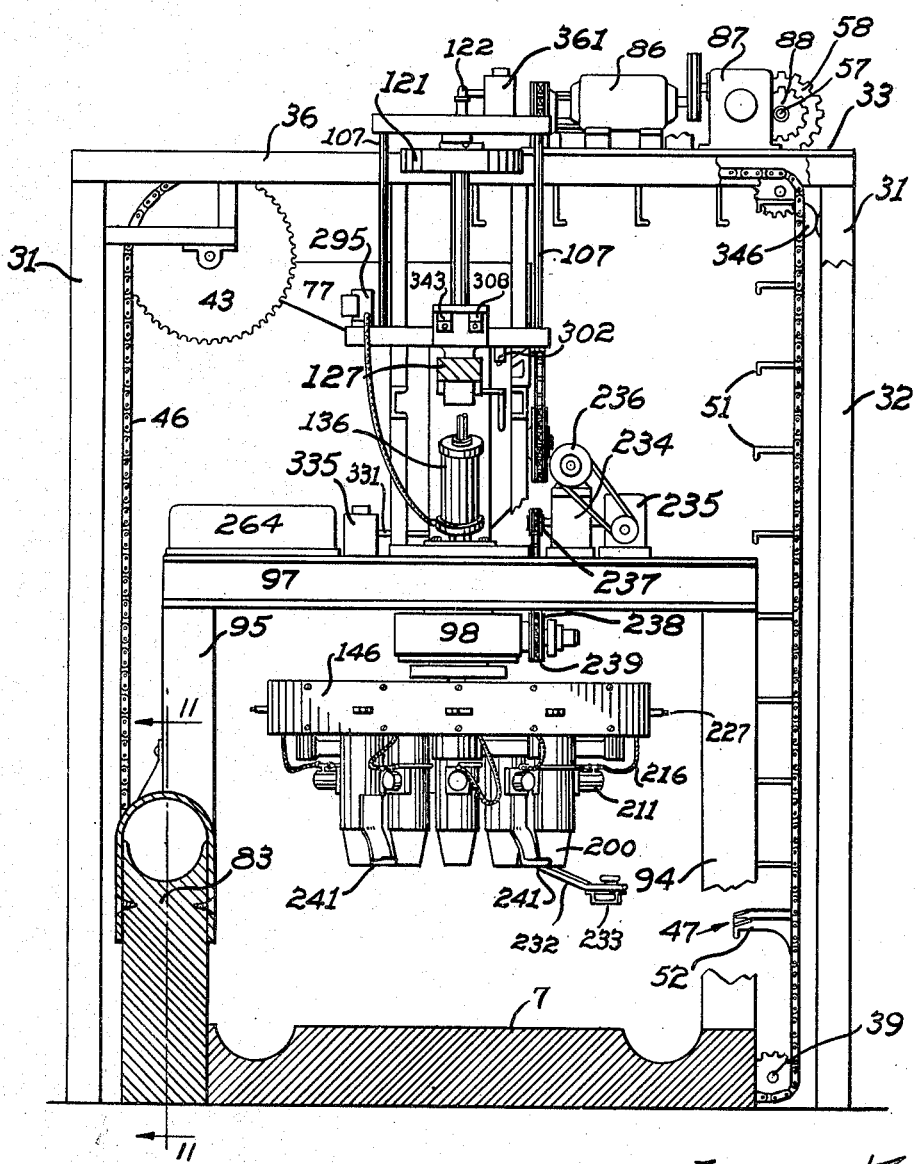
Figure 1 is a front view of the pin setting machine embodying my invention, showing the parts in the positions occupied thereby just prior to the descent of the pin rack in setting all pins, certain parts being broken away.

Figs. 32 and 33 are sectional views partly in elevation showing the structure of the solenoid operated valves 255, 295, 335 and 361;

Fig. 34 is a section substantially on the line 34—34 of Fig. 14, and

Fig. 35 is a wiring diagram of the electrical circuits with the parts in the rest position between pin setting cycles.

The pin setting machine is suitable for use in conventional bowling alleys and includes a gathering and conveying mechanism located in and above the pit 6 (Fig. 2) at the end of the alley floor 7 and which serves to gather the pins and the ball out of the pit, elevate the ball and deliver it to the ball return track and carry the pins to an elevated position in which the pins are oriented and delivered to a pin rack mechanism.

The machine also includes a device for receiving the pins from the conveyer mechanism and resetting them in proper relationship on the alley together with a sweeper mechanism which functions to sweep the pins and ball from the end of the alley and into the pit at appropriate times. Control mechanism is provided for controlling the operation of the various devices in timed and proper sequence, the operation of the control mechanism being initiated by the bowler.

*Gathering and conveying mechanism*

The gathering and conveying mechanism comprises a frame structure, in this instance including front columns 31 and rear columns 32, the columns being positioned at or near the four corners of the pit 6 and acting to support an elevated rectangular frame structure (Fig. 6) comprising a plate 33, an end member 34, a rear member 35 and a front member 36, the entire frame structure being bolted, riveted or welded together into a rigid unit. The lower ends of the legs 32 are interconnected by a plate 30 (Fig. 5) and the lower ends of legs 31 are interconnected by a plate 37. Carried on the plate 30 adjacent the rear corners of the pit are sprockets 38 and carried on the plate 37 adjacent the other two corners of the pit are sprockets 39. The pit will, of course, be provided with the conventional bumper located against the back wall of the pit, but this has been omitted from the drawings for clarity. Sprockets 41 and 42 (Figs. 5 and 6) are rotatably carried on the frame member 35 directly above the sprockets 38, and sprockets 43 and 44 are carried on the frame member 36 directly above the sprockets 39. An endless chain 45 is trained over the sprockets 38, 41 and 42, and an endless chain 46 is trained over the sprockets 39, 43 and 44. Interconnecting the endless side chains 45 and 46 are a plurality of conveyer elements. These elements include at least one ball shelf in the leading position on the chains as indicated at 47, and a plurality (at least ten and preferably more) of pin shelves as indicated by the numeral 50 arranged in spaced relation on the chains. Additional ball shelves may, if desired, be provided, interspersed between the pin shelves. The pin shelves each comprise a crossbar 48 having plates 48a affixed to its ends, the plates having openings 49 for the reception of pins 49a fixed to and projecting from the chains. Shelf-like flanges 51 are affixed to each of the pin shelves, the flanges being of about one-half the length of the crossbars 48, and the flanges on successive crossbars being disposed alternately adjacent opposite ends of the bars as shown in Fig. 11. These flanges are about the same length as a bowling pin and are adapted to gather up the pins from the pit in the manner shown in dotted lines in Figs. 10 and 11 to elevate the pins singly for delivery in the manner later described. The ball shelf 47 likewise has a crossbar 47a provided with plates 47b at its ends provided with openings for pins 49a on the chains, the plates in this instance being mounted to incline the crossbar downward slightly toward the chain 46 when the parts occupy the position of Fig. 11. The plates 47b have outwardly projecting arms 52, the extremities of which are connected by an angle iron 53 to provide a sloping shelf or way of sufficient width to support a bowling ball between the angle iron and the face of the crossbar 47a but the distance therebetween should be sufficient to allow the pins to pass therebetween so that as the shelf turns the corner between the lower and the vertical reaches of the chains the ball will be retained on the shelf and the pins will pass therethrough. The shelf slopes so that the ball rolls to the front of the shelf to pass therefrom onto the conventional ball return groove 83, as will be apparent from Fig. 11. Thus the chains 45 and 46 and the cross bars provide a conveyer for gathering the ball and pins from the bottom of the pit by movement of the cross bars along the bottom of the pit and for elevating the ball and pins upwardly. The sprocket 44 is carried on a stub shaft 54 (Fig. 5) rotatably supported in a pillow block attached to the lower side of frame member 36, and likewise the sprocket 42 is carried on a similar stub shaft 54a rotatably supported on the lower side of frame member 35. On the outer end of the stub shaft 54 a gear 55 is carried which meshes with a gear 56 fixed to a shaft 57 mounted for rotation on the plate 33. The shaft 57 also carries a gear 58 which meshes with a gear 55a carried on the stub shaft 54a, whereby rotation of the shaft 57 causes simultaneous and equal rotation of the sprockets 42 and 44 to drive the conveyer chains.

Attached to the rear end of the shaft 57 is a bevel gear 59 which meshes with a bevel gear 61 on a shaft 62 (Fig. 6) extending crosswise of the alley and mounted in bearings 63 attached to the plate 33. The shaft 62 carries a sprocket 64 driving a chain 65 which serves to drive a pin orienting and feeding mechanism. This mechanism includes stringers 66 and 67 (Fig. 12), in this instance formed of U-shaped channel iron members, the opposite ends of the stringers being attached to the frame members 35 and 36 by depending brackets 68. Cross shafts 69 and 71 (Figs. 5 and 12) are supported for rotation on the stringers as by bearings 72 (Fig. 12), the shaft 69 carrying spaced pulleys 73 and 74 and the shaft 71 carrying similar spaced pulleys 75. Carried on the stringers and extending between the chains of the conveyer is a hopper 77, the hopper having a bottom opening disposed above the space between the pulleys and a bottom 76 extending upwardly and outwardly to a point in close relation to the plane of travel of the outer edge of the ball shelf as best shown in Figs. 6 and 12 and in such relation that the pins carried upwardly on the pin shelves 51 will be deposited on the bottom as the cross bars turn the corner about the sprockets 41 and 43, the pins rolling down the bottom 76 as shown at 80 in Fig. 12 and being received on spaced belts 78 and 79 trained on the pulleys. The hopper has a side portion and inclined bottom portion 81 which serve to deflect the pins onto the belts and prevent them from rolling completely across the belts under the momentum acquired by rolling down the bottom 76. The belts 78 and 79 are in parallelism, with their edges in spaced relation, the space being sufficient for the passage of the head of a pin therethrough, but less than the largest diameter of the pin. By properly spacing the belts it will be seen that the pin may be caused to pivot about a transverse axis so located that the head portion of the pin is heavier than the butt portion. This causes orientation of the pins with the butt ends projecting upwardly as shown in dotted lines in Fig. 12. The diameter of the pulleys 73 to 75 is in this instance made such that as the belts convey the pins in the direction indicated by the arrow in Fig. 2, the head ends of the pins will engage the shaft 69 as the pins are carried off the belts causing the pins to be deposited butt end downward into the pin chute presently to be described as shown in full lines in Fig. 12. The pulleys 73 to 75 and the belts 78 and 79 are driven by a sprocket 82 on the cross shaft 71 over which the chain 65 is trained.

The sprockets 38 and 39 and the sprockets 41 and 43 are so positioned that the ball shelf 47 moves upwardly directly in the plane of a ball return track of conventional design designated generally by the numeral 83 (Figs. 1 and 11), having a groove into which the ball carried on the shelf 47 rolls as soon as the bottom of the shelf comes into alignment with the groove, the ball rolling down the groove in the usual fashion to return to the playing station.

The conveyer is driven by a continuously running motor and gear mechanism mounted on the plate 33, the drive conventionally including an electric motor 86 which acts to drive a gear reduction 87. A gear 88 is attached to the shaft 57 and is driven from a gear 89 which is in turn driven through a conventional magnetic clutch 91, one element of the clutch being driven from the reduction gearing 87. The clutch is in this instance actuated by a solenoid indicated diagrammatically at 92 (Fig. 5). The solenoid functions when energized to hold the clutch in engagement while the conveyer chains 45 and 46 move through one complete revolution and come back to their starting point. Likewise the belts 78 and 79 will be driven during the entire period in which the conveyer chains are in motion and because of the difference between the gear ratios in the belt drive and in the conveyer chain drive at a substantially greater linear speed than the conveyer. Thus this gathering and conveying mechanism operates intermittently and when energized serves to gather the ball and the pins from the pit, deposit the ball in the ball return track, and deposit the pins one at a time into the pin guide for passage to the setting mechanism, whereupon the conveyer stops. The conveyer and orienting means are driven at a preselected rate of speed as compared with the pin rack presently to be described and at least at such a rate as to take the pins out from under the pin guide as fast as they can be delivered normally. In order that there shall be no obstruction in the bottom of the pit at the time at which the bowler casts the ball along the alley, that portion of the conveyer which lies in the bottom of the pit and adjacent the bottom of the pit when the conveyer is stopped is free of cross bars.

*Pin setting mechanism*

The pin setting mechanism comprises a frame including uprights 94 and 95 (Fig. 1) arranged on opposite sides of the alley and interconnecting top frame members 96 and 97 (Fig. 2), in this instance comprising structural steel of U-shaped cross-section. This frame structure spans the alley above the area in which the pins are to be set and adjacent the alley pit. Positioned on the frame substantially over the center of the alley is a body designated generally by the numeral 98 which is fixedly attached to the frame members 96 and 97 by any convenient means as by bolting or welding. Housed in the body below the plane of the frame members is a worm gear 99 and worm 101 (Fig. 14) meshing therewith, the worm gear 99 having a hub 102 (Fig. 14) bearing against the inner surface of a chamber 103, and a retainer plate 104 through which the lower end of the hub passes. Upwardly disposed from the body 98 is a cylinder 105 (Figs. 2 and 15), the cylinder terminating at a closure and switch block 108. Extending upwardly from the closure block are rods 107 supporting a switch block 109 in spaced relation to the block 108. Each of the blocks carry a plurality of self-contained precision snap acting switches the purpose of which will presently be described. Extending vertically through the center of the cylinder 105 and through the worm gear 99 is a shaft 111 in the form of a tube and a piston 112 in the cylinder 105 is fixed to this shaft to move the shaft and associated parts up and down upon the admission or release of fluid from the cylinder. The lower end of the shaft is provided with a keyway 113 (Figs. 13 and 14) and the worm gear 99 is provided with a key 114 so that the shaft may be driven in rotary motion by rotation of the worm gear, and the shaft may be moved longitudinally with respect to the worm gear as will presently be described. A stuffing box 115 acts to seal the junction between the tube and the bore through which the tube passes out of the body 98, and within the body is disposed a metal plate 116 having a depending tab 117 adapted to fill the keyway, the plate 116 being held in position by a plate 118 superimposed thereon.

Positioned on the shaft 111 for vertical movement therewith is a switch operating block 121 (Figs. 1, 2 and 15) which serves to operate switches in response to predetermined vertical movement of the shaft. Carried on the switch block 109 and projecting downward into the bore of the shaft 111 is an air supply tube 122 having substantially the same outer diameter as the diameter of the bore in the shaft 111 for snug reception therein, yet permitting longitudinal movement of the shaft with respect thereto. The block 121 carries a stuffing box 123 which prevents the escape of fluid between the air supply tube and the bore of the shaft. The air supply tube 122 serves to provide a supply of air to the pin rack mechanism attached to the lower end of the shaft 111 to be described later.

*Sweeper*

Attached to one side of the block 108 on a pivot 126 is a sweeper arm 127. The sweeper arm 127 is formed in two parts (Fig. 2) connected by a pivot 128 and one part of the arm is a relatively straight arm portion 129 having a stop 131 to limit its rotation in a clockwise direction facing Fig. 2. The portion 129 also has an ear 132 carrying a counterbalancing spring 133 connected to an ear 134 on the main portion of the arm for the purpose of substantially counterbalancing the weight of the portion 129. The portion 129 carries a rubber covered sweeper 135 of a length substantially equal to the width of the alley and shaped so as to be capable of engaging the pins and ball lying on the alley to sweep them into the pin as the arm moves from the full line position of Fig. 2 to the dotted line position thereof. Rubber covered rollers 130 are positioned to engage and roll along the gutters to prevent contact of the sweeper with the surface of the alley.

The arm is moved between said positions by means of an air cylinder 136 pivoted on the body 98 as shown at 137 and having a piston and piston rod 138 pivoted to the arm as shown at 139 so that when air or other fluid is admitted to the cylinder the piston is forced outward and the sweeper arm is elevated to the full line position, whereas when the fluid is exhausted from the cylinder the sweeper arm moves downwardly to the dotted line position under its own weight. The movement of the piston is controlled by valve means presently to be described which is provided with means to control the rate at which the fluid is permitted to pass out of the cylinder 136 to control the rate of descent. Attached to the arm adjacent the trunnion 126 is a switch operating finger 142 positioned and shaped to engage a switch 302 mounted on the lower side of the block 108 in the lower position of the arm, and a bracket 143 serves to support additional switches in a position to be engaged by the arm in the elevated position thereof. These switches function in the control of the mechanism as will presently appear.

Pin Rack

A pin rack shown in elevation in Figs. 1 and 2 but shown more in detail in Figs. 16 through 27 is attached to the lower end of the shaft 111 for rotation therewith and for vertical movement between an elevated position as shown in Figs. 1 and 2, and a lower position in which the lower ends of the pins rest on the top of the alley. This pin rack includes two spaced plates 147 and 148 (Figs. 20–22) fixedly interconnected by spacer rods 149. These plates carry a hub 151 fixedly attached to the shaft 111 as by a screw 144 and key 144a (Fig. 22), the hub having a channel 152 communicating with the bore of the shaft 111 for the passage of fluid therethrough to certain of the valves, as will presently appear. A shroud 146 may interconnect the plates at their periphery to enclose the space therebetween. The circular pin frame thus provided is divided into twelve equal segments of 30° each and on each of ten of the radii between these segments there is disposed a pin sleeve passing through the two plates as best shown in Figs. 16, 17 and 18, the sleeves being arranged with their centers approximately on a circle about the shaft 111. These sleeves are numbered 161 through 170 (Fig. 16), the numbers corresponding to pins numbered 1 through 10 as conventionally designated in the usual triangular ten pin pattern. Thus, sleeve numbered 161 functions to guide bowling pin No. 1 into its proper seated position in the pin rack, sleeve 162 functions to guide pin No. 2 into its position, etc. Each of these sleeves consists of a frusto-conical tube 172 attached to the plate 147, the walls sloping inwardly toward the bottom and being attached by welding or otherwise to the plate 148.

Integral with the sleeves 162, 163, 164, 166, 168 and 169 and depending from the plane of the plate 148 in the manner shown in Fig. 17 are pin holders in the form of tubes indicated generally by the numerals 174 through 179, respectively (Fig. 23), these tubes being substantially identical in form and of such diameter as to receive a bowling pin as it passes through the pin guide presently to be described and to retain the pin therein until the pins are set on the alley, each of the pin tubes having a pin gripping mechanism functioning for this purpose. Below the pin sleeves 161, 167, 165 and 170 are movable pin tubes 181, 182, 183 and 184, each arranged in the manner shown in Fig. 18 so as to be capable of movement with respect to its sleeve. The pin tube 181 is carried on an arm 186 fixed to a bearing pin 187 passing through the plates and having a lever 188 (Fig. 19) between the plates pivotally connected to a rod 189 pivoted on a bell crank 190 which is fixed on a rotatable pin 191 having bearing support in the plates. The bell crank and pin are rotated by a pivotally mounted fluid cylinder and piston 192, whereby when the piston is forced outward in response to the admission of fluid into the cylinder the tube 181 is swung into position under the pin sleeve 161. A spring 193 swings the tube from its position in the circle to a point best shown in dotted lines in Figs. 16 and 23 upon the release of pressure from the cylinder, thus moving the pin carried by this tube into its proper position in the conventional triangular pattern.

Figure 23:
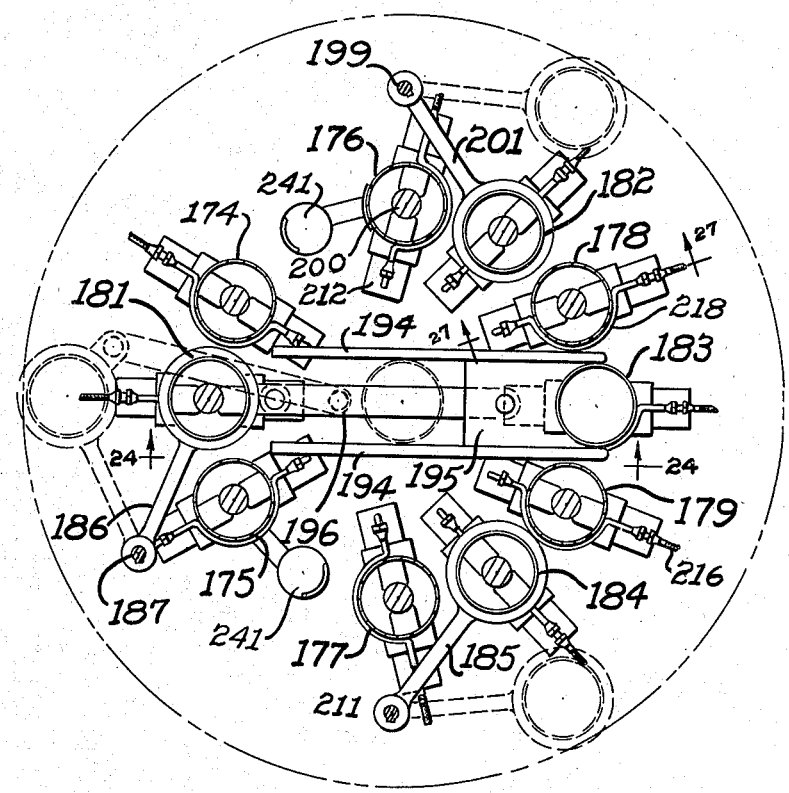
Fig. 23 is a section on the line 23—23 of Figure 2 showing the upper ends of the pin tubes, the parts occupying the same positions as in Figs. 16 and 19.
Figure 24:
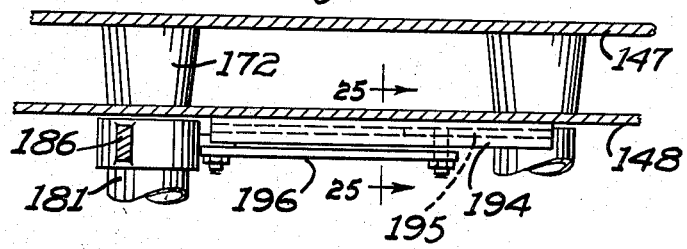
Fig. 24 is a view on the line 24—24 of Fig. 23.
Figure 25:
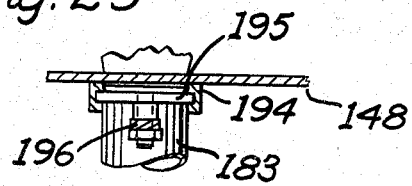
Fig. 25 is a section on the line 25—25 of Fig. 24.
Figure 26:
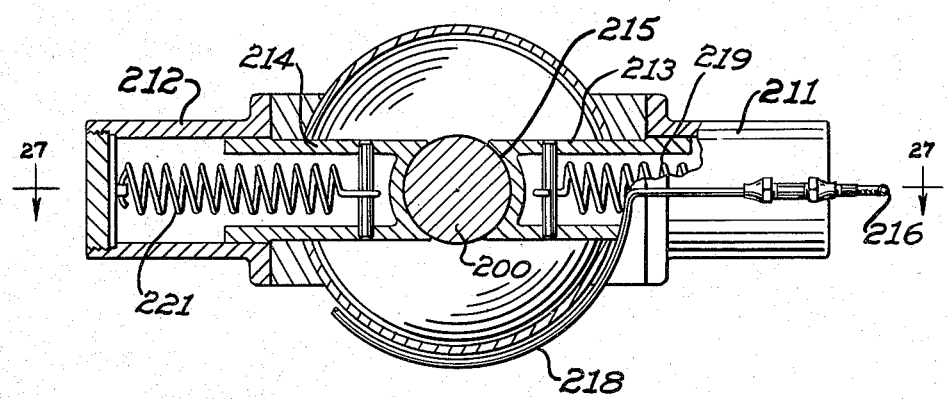
Fig. 26 is a horizontal section through one of the pin tubes and the pin grips associated therewith.
Figure 27:
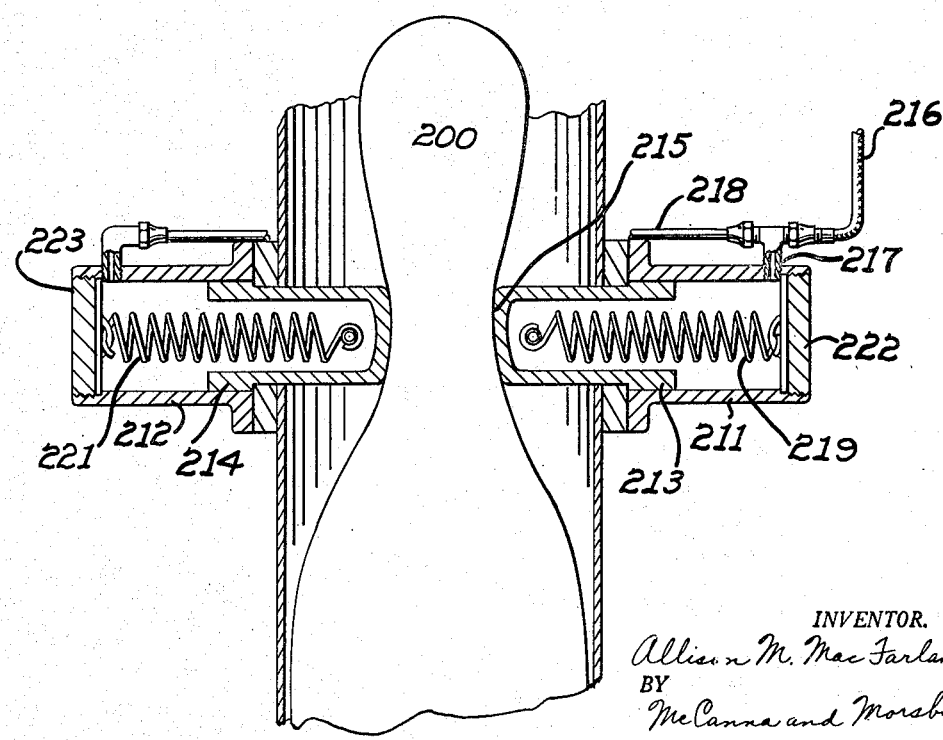
Fig. 27 is a section on the line 27—27 of Fig. 26.

Attached to the lower end of bearing pin 191 below plate 148 is an arm 185 which serves to support pin tube 184 for movement between the full line position of Fig. 23 on the loading circle and the dotted line position in the triangular pattern in response to the above mentioned operation of the piston and cylinder 192.

Secured to the bottom of plate 148 are a pair of spaced slideways 194 adapted for reception therebetween of the pin tube 183, the tube having a slidable guide plate 195 for reception in the ways. The ways extend between the loading circle and the center of the circle as will be seen from Fig. 23 and act to carry the tube between the full and dotted line positions representing the circular and triangular positions thereof. A link 196 is pivoted on the plate 195 and on the tube 181 so that as the tube 181 is swung between its full and its dotted line positions by operation of the cylinder and piston 192 and of the spring 193, the tube 183 is moved between its respective positions.

Also carried between the plates is a fluid cylinder and piston 197 which functions through a link 198 to rotate a bearing pin 199 journaled in plates 147 and 148 to which is attached an arm 201 (Fig. 23) carrying the pin tube 182. When fluid under pressure is admitted to the cylinder 197 the link, pin and arm are moved so as to swing the tube into its position in the circle whereas when the fluid is exhausted from the cylinder a spring 208 functions to move the tube into its proper position in the triangular pattern.

Pin grips

Mounted on each of the pin tubes is a fluid operated pin gripping device. The pin grippers mounted on the stationary tubes may be connected to the bore of the shaft 111 for the reception of pressure fluid therefrom by rigid tubing, whereas flexible tubing is employed for connection to the pin grippers on the movable tubes 181, 182, 183 and 184. These pin grippers may each conveniently take the form shown in Figs. 26 and 27 in which the numerals 211 and 212 designate fluid cylinders attached to the pin tube on diametrically opposite sides thereof the cylinders carrying pistons 213 and 214 having their outer ends as shown at 215 complemental to and shaped to grip against the opposite sides of bowling pin 200 in the area of smallest diameter so as to center the pin in the tube and retain the pin therein in centered relationship with the lower end of the pin projecting out of the bottom end of the tube as shown in Figs. 1 and 2. The pistons of each grip are moved to the closed or pin gripping position by fluid admitted back of the pistons from a tube 216 leading to each grip having two branches 217 and 218 leading to the two opposed cylinders. When the fluid pressure is relieved from the cylinders, springs 219 and 221 having one end attached to the pistons and the other end thereof attached to cylinder heads 222 and 223 act to pull the pistons into the cylinders and release the pins from the grippers. The fluid pressure supply tubes 216 leading to each of the pin grips pass upwardly as shown in Figs. 17, 19 and 21 through the plate 148 to individual control valves 224 located between the plates radially opposite each pin tube. Air is supplied to the individual valves through a manifold 226 connected to the fluid channel 152 at the hub of the rack (Fig. 22) by a pipe 225.

The individual valves 224 shown in detail in Figs. 30 and 31 are spring pressed to open position and each has an operating stem 227 projecting outwardly from the rack and adapted for cam operation as will presently be described to terminate the supply of fluid to the cylinders and open the same to atmosphere for separate opening of the individual grippers. The valves 224 may be of conventional form, one suitable structure being shown in Figs. 30 and 31 and comprising a body 401 having a central bore 402 within which is disposed a slidable valve member 403 spring pressed to the position shown in Fig. 30 and having ports establishing communication between the tubes 226 and 216. The valve member has an annular collar 404 which when the stem is moved inward closes communication between tubes 226 and 216 and opens communication between the tube 216 and a vent opening 405 in the valve body.

Pin guide

Mounted on the body 98 (Figs. 2 and 12) is a pin guiding means, in this instance a pin chute 228 extending from a point adjacent the pulleys 73 and 74, in a position to receive the pins discharged from the belts, to a point directly above the pin wheel so that the pins carried forward on the belts are discharged into the chute and fall under gravity through the chute and into one of the pin tubes, the lower end of the chute being in alignment with one of the pin tubes in each position of rest of the pin rack. In order that the pin grip shall be in open position whenever a pin tube rests beneath the chute, a cam 229 is provided positioned on a swinging arm 232 attached to a spindle 231 pivoted on a laterally disposed bracket portion 230 of the body 98, this cam being disposed in the path of the operating stems 227 of the pin grip valves 224, the cam acting to move the valve stem inward to a position to cut off the supply of pressure fluid to the pin grips and open the pin grip cylinders to the atmosphere.

Pin block

The rate of rotation of the pin rack is so timed with the speed of the conveyer that the rack will normally index between its successive positions at a faster rate than the pins are delivered by the conveyer. However, as a safety measure there is carried on the pin chute 228 a pin block comprising a lever 242 which projects into the pin chute in the path of the pins, the lever being pivoted as shown at 243 and attached to the rod of a fluid cylinder and piston 246. A valve 247 operates to control the flow of pressure fluid to the cylinder 246 and when the valve is operated to apply pressure therein, the lever 242 is rotated to bring the end thereof into the chute and block the passage of pins therethrough until the rack has completed its indexing movement. The valve 247 is a conventional fluid control valve similar to that shown in Figs. 32 and 33 having a solenoid 248 for operating the valve to admit pressure to the cylinder and a spring 249 for moving the valve to a position to connect the cylinder to atmosphere upon deenergization of the solenoid. A spring 244 acts on the lever 242 to withdraw the end from the chute and permit the passage of pins therethrough.

Pin stop

The pin falling through the chute and into the pin tube comes to rest on the end of an arm 232 which stops the movement of the pin. When the pin engages the end of the arm 232 the weight of the pin functions to operate an initiation means by depressing button 202 (Fig. 4) against the action of return spring 203, closing an electrical switch 233 disposed thereon which functions through the circuit shown in Fig. 35 to energize a conventional one-turn clutch 234 (Fig. 1) mounted on the frame members 96 and 97 thereby engaging the clutch and connecting a gear train 235 driven by a continuously running motor 236 to the shaft of a sprocket 237 which drives a chain 238 trained over a sprocket 239 carried on the shaft of the worm 101 (Fig. 2). The speed relation between the one-turn clutch 234 and the pin wheel is such that upon each energization of the clutch the pin wheel is turned through 30° to bring the next succeeding pin tube into position beneath the chute 228. As the pin rack starts its movement the stem 227 of the valve 224 moves away from cam 229 to admit pressure fluid within the pin grip cylinders to grip the pin and hold it in position after it moves off the end of the lever 232 and as the pin rack continues rotation bringing the next tube into pin receiving position, the cam 229 acts to open the pin grip thereof. It will be seen from an examination of Figs. 16 and 23 that there are two of the 30° segments of the circle which are unoccupied by a tube, namely between the sleeves 162 and 164 and between the sleeves 163 and 166. In order to cause these blank stations to pass the loading station, cams 241 (Fig. 2) are provided attached to the adjoining tubes 163, 164 and depending to a point to engage the button 202 and actuate the switch 233 as these spaces pass the loading station, causing the clutch 234 to be immediately reengaged to move the pin rack to the next position.

In order to move the arm 232 out of the path of the pins and pin rack when the pin rack moves to its lower position, the spindle 231 has an arm 252 (Fig. 3) connected by a link 253 to a piston and cylinder 254. The supply of pressure fluid to the cylinder is controlled from a valve 255 of the form shown in Fig. 30, having solenoids 256 and 257 for moving the valve between a position admitting pressure fluid to the cylinder to hold the arm under the pin rack and a position connecting the cylinder to atmosphere to permit a spring 250 to swing the arm out of the path of the pin rack. Spindle 231 also carries a finger 240 rotatable therewith and arranged to actuate a switch 332 on the bracket 230 as hereinafter described.

The control mechanism which will be described more in detail in connection with the operation of the device in this instance includes a manual control box shown in Fig. 7 located at a convenient spot near the bowling station where it is accessible to the bowler for the purpose of cintrolling the resetting of the pins as desired. This control box has a pair of control buttons 262 and 263 on the exterior thereof and is suitably electrically connected to a program motor and switch mechanism designated generally by the numeral 264 and shown in Figs. 1 and 8. The program motor includes a base 260, in this instance mounted on the frame members 96 and 97 adjacent the pin setting mechanism and a cover 260a. The program motor includes a motor 265 on the base arranged to drive a cam shaft 266 carrying a plurality of cams as will later be described through a gear box 267 and single turn clutch 268 of conventional design, the clutch being actuated through a solenoid operator 269 so that when the clutch is actuated the shaft 266 will turn through one complete revolution and then stop. The shaft 266 is mounted for rotation in brackets 284 on the base 260, which also serve to support a plurality of electric switches in operative relationship with the cams. These switches are precision, pin plunger type switches such as are well known in the art and are provided with holes passing through the body of the switch for mounting purposes. Rods 286 are mounted in the brackets 284 and pass through the mounting holes of the switches as shown in Figs. 8 and 9, the switches being spaced by spacing tubes 286a disposed on the rods. The control is such that the complete pin gathering and resetting operation occurs during the single rotation of the shaft 266 as hereinafter described.

Operation

In the use of the pin setting machine two modes of operation must be provided, one succession of operations being that necessary when all of the ten pins are to be set at a single time such as occurs after the bowler has scored a strike. The second condition is that when a ball has been rolled, knocking down some of the pins and leaving others standing and it becomes necessary to clear the alley of so-called dead wood, and to remove the pins and the ball from the pit before rolling a second ball.

Set all pins

When all of the pins are to be set the bowler presses button 262 of the control box inward, swinging toggle lever 271 about its pivot point 261 until contactor 273 engages contact 274. A spring 272 (Fig. 7) acts with the lever 271 to provide an overcenter toggle. During this movement contactor 275 engages and flexes contact spring member 276 and upon release of the button 262 by the operator the spring 276 moves lever 271 back to the position shown in Figs. 7 and 35 moving contactor 273 back out of engagement with contact 274 but retaining electrical contact between contactor 275 and spring 276. Upon the closing of contactor 273 and contact 274 the clutch magnet 269 is momentarily energized to engage the clutch 268 by way of a circuit (Fig. 35) from power line L—1 comprising feed line 278, lever 271, contactor 273 and contact 274, a conductor 277 and coil 269 connected to feed line 279 energized from the other side L—2 of the power line thereby starting rotation of the shaft 266 of the program motor. The motor 265 runs continuously and receives its power through the feed line 279 and a feed line 270 connected to power line L—1. This movement of lever 271 also acts to complete the circuit between contactor 275 and spring 276 to supply power to a plurality of switches 363, 333, 306 and 393, controlled by cam disks 280 through 283 by way of a conductor 285 and to break the circuit between contactor 275 and a contact 276a connected to the switches operated by cams 287 to 292 with the exception of a switch 381. All of the switches operated by the cams of the program motor are of the precision snap acting type, such for example as that shown in U. S. Letters Patent 1,960,020 to McGall, and operable with a very small movement so that cams with a rapid rise may be employed and accurately set.

Shortly after the clutch engages and shaft 266 starts rotation, the lobe on cam 280 momentarily closes a switch 293 energizing solenoid 294 of a sweeper arm control valve 295 of the type shown in Figs. 32 and 33, moving this valve to a position to open the interior of cylinder 136 to the atmosphere and release the pressure fluid therefrom. This allows the sweeper arm to fall under its own weight moving any pins or ball which may rest on the alley, into the pit, an adjustable needle valve 349 (Figs. 32 and 33) acting to control the speed of this descent. Energization of the solenoid 294 is by way of a circuit including the conductor 285, switch 293, a conductor 297, a switch 298 located on the switch block 109, a conductor 299, the solenoid 294 and a conductor 301 connected to a feed line 261 to power line L—2. The switch 298 is held closed when the pin rack occupies its elevated position, its presence in the circuit preventing the sweeper arm from descending except when the pin wheel is elevated to maintain the switch 298 closed. The cam 280 closes the switch 293 only momentarily and the switch reopens before the sweeper arm reaches its lower position.

When the sweeper arm 127 reaches its lowermost position such as that indicated in dotted lines in Fig. 2 the finger 142 operated by the sweeper arm acts to close a switch 302 of the normally open type which completes a circuit to a solenoid 303 of the sweeper arm valve 295 which shifts the valve back to its normal position, the coil 294 having been deenergized by opening of switch 293. This circuit includes a feed line 251 from line L—1, a conductor 304, switch 302, coil 303 and conductor 301 to line 261. The valve admits pressure fluid to the cylinder 136, thereby raising the sweeper arm and returning it to the full line position of Fig. 2.

When the sweeper arm starts upwardly the finger 142 moves away from the switch 302 opening the circuit to coil 303 but the valve 295 remains in its new position holding the sweeper arm up for the reason that the coils 294 and 303 are both deenergized.

About the time that the sweeper arm has reached its upper position the lobe on cam 281 closes a switch 306 which functions to energize the solenoid 92 of the conveyor mechanism to start the conveyer by way of conductor 285, switch 306, conductor 307, switch 308, a conductor 309, a switch 311, a conductor 312, the coil of solenoid 92 and feed lines 310 and 313. The switch 308 is a safety interlock which is open except when the sweeper arm occupies its elevated position to thereby prevent energization of the conveyer except when the sweeper arm is out of the way and the switch 311 is a switch of the normally open type and serves as an interlock to prevent operation of the conveyer except when the pin rack occupies its elevated position. When the conveyer has moved a short distance a cam 346 carried thereon moves away from a switch operator 340 suspended in its path from the frame allowing a switch 320 of the normally closed type to close, thereby energizing solenoid 92 directly from line L—1 through a conductor 336. This initial movement of the conveyer also brings the cam 346 into engagement with a switch 328 of the normally open type which serves to energize a solenoid 257 of the valve 255 to admit pressure fluid to the cylinder 254 and move the arm 232 into operative position under the pin rack. This circuit includes switch 328 connected to L—1, conductor 323, conductor 305, coil 257 and conductor 329.

During the operation of the conveyer the pins are delivered to the orienting device from which they are deposited into the pin chute 228. Carried on the shaft of the worm 101 is a cam 314 adapted to open a switch 315 of the normally closed type when the clutch 234 and the worm are in their stopped position and a pin tube is disposed beneath the pin chute 228. The switch 315 is connected to energize the solenoid 248 of the pin block mechanism by way of a conductor 310 connected to feed line 251, switch 315, a conductor 316 and solenoid 248 connected to feed line 261. Whenever the pin rack is in position to receive a pin the switch 315 is open and the solenoid 248 deenergized allowing spring 249 to move the valve 247 to a position to connect the cylinder 246 to atmosphere and spring 244 acts to hold the pin block in a retracted position permitting the pins to pass directly through the chute and into the pin tubes.

As each pin strikes and closes the normally open switch 233 of the pin stop this switch functions to energize the solenoid 317 of the once around clutch 234, through a circuit from feed line 251, switch 233, a conductor 319, the coil 317 and a conductor 321 to feed line 261, thereby engaging the clutch for one revolution and indexing the pin rack to the next pin receiving station. As soon as the pin wheel starts to move the pin comes out of engagement with switch 233 allowing this switch to open. Likewise as soon as the worm 101 rotates a short distance the cam 314 closes switch 315 thereby energizing solenoid 248 and moving the pin stop 242 into a position blocking the chute, in which, should a pin enter the chute while the pin wheel is in rotation, the pin will be retained until the next station is reached and an empty pin tube is positioned under the lower end of the chute. When this position is reached the cam 314 again opens switch 315 and the pin stop is withdrawn. This operation is continued as long as pins are delivered into the pin rack, the cams 241 acting to operate the switch 233 to cause the pin rack to pass through the stations at which no pin tube is located. As previously pointed out, the pin grip of each tube is operated to open and close the grip as the tube passes into and out of the pin receiving station by action of the cam 229.

When the pin wheel has rotated slightly more than 330° from its starting position and after the tenth pin has closed switch 233 to start indexing the wheel through its final 30° step, a cam 322 attached to the hub 102 of worm gear 99 acts to close a switch 324 of the normally open type which closes a circuit to the solenoid 256 of air valve 255 by way of a circuit comprising a conductor 325 attached to feeder line 251, switch 324, a conductor 326, solenoid 256, and conductor 329 to feed line 261 to connect the cylinder 254 to atmosphere and permit spring 250 to swing the arm 232 out from under the pin rack. Thus the switch 233 is moved out of the path of the pins while the rack is completing its last indexing step and before it reaches its final angular position in which the pins are set on the alley. This serves to prevent further rotation of the pin rack and also prepares the mechanism for unloading of the rack. As the arm moves out the cam 229 moves out of the path of the stems of the pin grip air valves so that all of these valves are closed. Coincidental with this movement of the arm 232 the finger 240 rotates to close switch 332 of the normally open type and in this instance of the precision pin plunger type which is a safety interlock switch connected into the circuit of the pin rack controls and which acts to prevent the pin rack from being lowered until the arm 232 is out of the way. When the pin rack completes its final rotary movement the lobe on cam 322 comes into engagement with and closes a switch 339 of the normally open type and stops in position to hold this switch closed.

Rotation of cam shaft 266 now brings the lobe of cam 282 into contact with a switch 333 closing the same to energize the solenoid 334 of the pin rack control valve 335 (see Fig. 1) which acts to connect the interior of the pin rack cylinder 105 with the atmosphere, the valve 335 being connected with the bottom of the cylinder through a tube 331 (Fig. 1), the circuit comprising conductor 285, switch 333, conductor 337, switch 339, a conductor 341, switch 332, a conductor 342, switch 343 carried on bracket 143 (Fig. 2) and operated by the sweeper arm 127, a switch 345 operated by lug 346 on the conveyer chain, a conductor 347, coil 334 and conductor 348 connected to feeder line 261. The switches 339, 345, 332 and 343 are safety interlock switches, the switch 339 being to prevent the pin rack from being lowered except when the wheel has rotated to its proper position, the switch 345 preventing the operation of valve 335 except when the conveyer is in its rest position, the switch 332 preventing operation of the valve except when the arm 232 is out from under the pin rack and the switch 343 preventing operation of the valve except when the sweeper arm is in its elevated position.

When the pressure fluid is released from the interior of cylinder 105 the pin rack descends under its own weight, the rate of descent being controlled by the adjustment of a needle valve 349 (Figs. 32 and 33). As the pin rack starts down an air valve 351 (Figs. 14, 28 and 29) disposed on the pin rack, connected to the cylinders 192 and 197 of the pin tube swinging mechanism by pressure tubes 350 (Fig. 19) and to the air supply tube 225 by a tube 327, is operated to simultaneously connect the cylinders to the atmosphere so that the pin tubes 181, 182, 183, and 184 are shifted from their circular position into their triangular position under the action of springs 193 and 208. The valve 351 which is of conventional design has a body 353 in which is slidably disposed a centrally recessed plunger 352 urged outwardly as shown in Fig. 28 by a spring 356 to connect the tube 350 to atmosphere. The valve is mounted in the plate 147 in such position that the plunger engages the lower side of the cam 322 when the pin rack moves to its upper position thereby moving the plunger to the position shown in Fig. 29 to close the connection to atmosphere and connect tube 327 to tube 350 and admit fluid pressure to the cylinders. Thus pressure is applied to cylinders 192 and 197 whenever the pin rack occupies its elevated position to hold the pin tubes in the circular pattern, and the pressure is released whenever the pin rack moves out of its elevated position for movement of the tubes to the triangular pattern.

The mechanism is so adjusted that when the piston 112 reaches the bottom of the cylinder 105, the pins come to rest on the alley in the required positions. Simultaneously the switch operating bar 121 engages and closes switch 354 of the normally open type connected with coil 355 of the main pin grip valve 361 to operate valve 361 (Figs. 1 and 2) which controls the flow of pressure fluid to all of the pin grip cylinders. When the coil 355 is energized the valve 361 is rotated to a position to connect the interior of the cylinders with the atmosphere and as a result the springs act to open the pin grips and release the pins. Power is supplied to the switch 354 and the coil 355 from conductor 270 through contacts 356 of a relay 360, a conductor 369, a conductor 357, switch 354, conductors 370 and 389, coil 355 and conductor 359. The solenoid 360 is connected between conductors 285 and 279 and is moved to close contacts 356 when contactor 275 engages spring 276 and opens when these parts are disengaged, in the latter position closing a second pair of contacts 372 on the relay. The switch operating bar 121 also engages and closes a switch 362 of the normally open type when the pin rack reaches the bottom, preconditioning a circuit to a switch 363 for the return of the pin rack to its upper position.

Cam 283 now acts to close switch 363 which is connected to a coil 364 of air valve 335, switch 362 being in circuit therewith, the circuit comprising conductor 285, switch 363, conductor 365, switch 362, a conductor 366, coil 364 and conductor 348 to feed line 261. This acts to shift valve 335 to admit fluid pressure within the cylinder 105 which forces piston 112 upwardly carrying with it the pin rack. As the pin rack reaches its upper position the valve 351 is again actuated by engagement with cam 322 to admit pressure in the cylinders 192 and 197 to shift the movable pin tubes to the circular position. Likewise when the pin rack reaches its upper position the operating bar 121 closes a switch 367 to complete a circuit to coil 368 of the pin grip valve 361 from feed line 251, a conductor 369, switch 367, a conductor 371, coil 368 and conductors 359 and 348 to feed line 261, shifting this valve to admit pressure to the pin grip cylinders and close the same. The shaft 266 has by this time completed its revolution and come to rest.

The pins and ball have now been removed from the pit, the pins have been reset on the alley and the parts have returned to rest position and are now in position for the casting of a ball by the bowler.

*Reset standing pins*

When the bowler desires to reset the standing pins such, for example, as when a single ball has been cast and some of the pins remain standing, the bowler in order to remove the pins and ball from the pit, depresses button 263, swinging the toggle lever 271 over the compression center created by spring 272, bringing contactor 275 into contact with a contact carrying blade 276a and then further depressing the lever to flex the carrier 276a until a contact 373 is engaged by contact 273. Engagement with the contact 373 operates the clutch 268 through the circuit comprising conductor 278, lever 271, contact 373, a conductor 374, conductor 277, coil 269 and conductor 279. Upon release of the button 263 the contact 373 is reopened but the contactor 275 is maintained in engagement with blade 276a preconditioning the circuit to switches operated by cams 287 to 292 through conductor 376 and de-energizing the switches operated by cams 280 through 283. Solenoid 360 is now deenergized closing contacts 372 to supply power to a switch 381 operated by cam 288.

When the shaft 266 starts its rotation, cam 287 closes switch contacts 375 connected to solenoid 334 of pin rack valve 335 through a circuit including conductor 376, switch 375, a conductor 377, conductors 338 and 337, switch 339, conductor 341, switch 332, conductor 342, switch 343, conductor 344, switch 345, conductor 347, coil 334 and conductor 348. This connects the pin rack cylinder 105 to atmosphere and allows the pin rack to descend. Substantially coincidental with the closing of switch 375 switch 378 which is connected to solenoid 355 of the pin grip valve 361 closes through a circuit comprising conductor 373, switch 378, conductors 379 and 389, coil 355, and conductors 359 and 348. This connects the cylinders of the pin grips to atmosphere and allows the cylinders to open under the action of their springs. As the pin rack starts down the plunger of valve 351 moves away from cam 322 connecting cylinders 192 and 197 to atmosphere and swinging the movable pin tubes to the triangular position under the action of their springs. Switch 381 of the normally closed type operated by a cam 288 is disposed in series with the switch 354, the cam acting to open switch 381 prior to the time the pin rack reaches its lowermost position to prevent flow of current upon closing switch 354 and thereby prevent operation of solenoid 355 and to close switch 381 to reenergize switch 354 after the pin rack starts up. The cam 288, substantially simultaneously with opening of switch 381, closes a switch 382 connected to a switch 383 of the normally open type carried on the switch block 108 to precondition this switch. When the switch operating bar 121 engages switch 383 closing the same, coincidental with the pin rack reaching its lower position, solenoid 368 of the pin grip valve 361 is energized by a circuit comprising conductor 376, switch 382, conductor 384, switch 383, conductor 371, coil 368 and conductor 359, moving the valve to a position to admit fluid pressure to the pin grip cylinders and cause the grips to close on any pins remaining standing. The lobe on cam 288 is of such length as to reopen switch 382 and close switch 381 prior to the time the pin rack is again lowered to reset the pins.

Also during this descent of the pin rack the bar 121 engages the switch 362, and substantially coincidental with the pin rack reaching its bottom position or preferably slightly thereafter, cam 289 closes switch 385. The switches 362 and 385 are connected in circuit with the solenoid 364 of the pin rack valve 335 to shift the valve and admit fluid pressure to the cylinder 105 to raise the pin rack, this circuit including conductor 376, switch 385, conductors 386, 365, switch 362, conductor 366, solenoid 334, and conductor 348. By adjustment of the position of the cam 289 the raising of the pin rack can be timed with respect to the operation of the pin grips.

At or immediately after return of the pin rack to its upper position, cam 290 momentarily closes a switch 388 connected to solenoid 294 of the sweeper valve 295 through a circuit comprising conductor 376, switch 388, conductor 390, an interlocking switch 391, conductors 392 and 299, coil 294 and conductor 301, moving the valve to a position to connect the cylinder 136 to atmosphere and allow the descent of the sweeper. The switch 391, operated by the operating bar 121, prevents the sweeper from descending in the event the pin rack is not in its up position.

When the sweeper arm reaches its bottom position the finger 142 closes switch 302 completing the previously described circuit to the solenoid 303 of the sweeper valve shifting the valve to admit pressure fluid to the sweeper cylinder to raise the sweeper arm. Cam 291 now closes switch 393 connected to solenoid 334 of the pin rack valve 335 through a circuit including the conductor 376, switch 393, a conductor 394, conductors 338, 337, interlocking switch 339, conductor 341, switch 332, conductor 342, switch 343, conductor 344, switch 345, conductor 347, coil 334 and conductor 348, this acting to connect the pin rack cylinder 105 to atmosphere to allow the descent of the pin rack with coincidental change in the position of the pin tubes to deposit the pins picked up.

When the pin rack reaches its bottom position the bar 121 again closes switch 354 to open the pin grips. The switch 354 is now energized and the switch 383 deenergized by reason of cam 288 having rotated to open switch 382 and close switch 381 and consequently when switch 354 is closed current flows through solenoid 355 from conductors 376 and 380, contacts 372, a conductor 397, switch 381, conductors 397 and 357, switch 354, conductors 370 and 389, solenoid 355 and conductors 359 and 348. The bar 121 also closes switch 362 in series with the cam operated switch 385 and connected to solenoid 364 of the valve 335, the cam 289 having a second lobe for closing switch 385 to energize switch 362 at this time and return the pin rack to its elevated position. When the pin rack reaches its elevated position the bar 121 closes switch 367 which energizes coil 368 as previously described to reclose the pin grips.

Cam 292 on the cam shaft 266 now closes switch 395 connected in circuit with solenoid 92 of the drive for the conveyer mechanism through conductor 376, switch 395, conductors 396, 307, switch 308 operated by the sweeper arm, conductor 309, switch 311, on the switch block 199, conductor 312, the solenoid 92 and conductors 310 and 313. This restarts the conveyer mechanism which runs through a complete revolution, stopping in response to deenergization of solenoid 92 when lug 346 opens switch 329. As previously described the cam 346 momentarily closes switch 328 as soon as the conveyer starts to swing the arm 232 under the pin rack. The pins are carried upward and delivered into the pin tubes and the ball is returned to the playing station. As the pins successively fall into the pin tubes and engage the switch 233 they energize the once around clutch 234 and index the pin rack to receive successive pins, this indexing continuing until no more pins drop to actuate the switch 233 whereupon the pin rack and the balance of the mechanism come to rest. After casting the next ball it becomes necessary under the rules of the game to reset all of the pins, which the player does by pressing button 262. While the pin rack is now already partly filled with pins when the conveyer starts, the re-filling continues from this point as pins are delivered and the mechanism goes through the previously described cycle of setting all pins.

The valve 255 is shown in section in Figs. 32 and 33 and the valves 295, 335 and 361 are substantially identical therewith. The valve includes the solenoids 256 and 257 having plungers 408 and 409 pivotally connected to a crank 411 by a crank pin 412. The crank 411 is attached to a spindle 413 mounted in the valve body 414 having channels 415 and 416. The end of the body is covered by a cap 417 secured to the body and provided with a chamber to which an air supply tube 419 is connected. A valve rotor member 421 is held in contact with the valve body 414 by a spring 418 and has a port 422 therethrough adapted to establish communication between the air supply tube 419 and the channel 416 in one position of the valve, the channel 416 being connected by a pipe 423 to the interior of the cylinder 254 so that pressure fluid is supplied to the cylinder. The valve rotor also has a transfer passage 424 adapted in the position of the valve shown in Fig. 33 to establish communication between the channels 415 and 416 to permit the flow of fluid out of the cylinder through the adjustable needle valve 349, the rate of this flow being adjustable by this needle valve.

As will be recognized by those skilled in the art, the conditions under which machines of this type are used vary to a substantial degree and consequently it is necessary with each machine to adjust the position of the cams of the program motor and make other suitable adjustments to properly time the various operations, and under some circumstances it may be necessary to vary the length of the lobes on the cams to properly time the sequence.

I claim:

1. The combination in a pin setting machine for bowling alleys of the type having an alley floor, and a pit, of a pin rack disposed over the alley floor, means for moving the pin rack between an elevated loading position and a lowered position to deposit pins contained therein on the alley floor in a preselected pattern, said pin rack comprising a plurality of pin holders each open at both ends for the reception of a pin therein from the top and the discharge thereof from the bottom, means for supporting said pin holders in a configuration approximating a circle in the loading position of the rack and for moving certain of the pin holders out of said configuration into a position to form a triangle with the remainder thereof in the lowered position of the pin rack, pin loading means disposed above the pin holders for guiding pins downwardly into the holders at a preselected point above the pin rack, and means for rotating the pin rack in the loading position thereof about the approximate center of said circle to distribute pins into successive pin holders.

2. The combination in a pin setting machine for bowling alleys of the type having an alley floor, and a pit, of a pin rack disposed over the alley floor means for moving the rack between an elevated loading position and a lowered position to deposit pins contained therein on the alley floor in a preselected pattern, said pin rack comprising a plurality of pin holders, means for supporting said pin holders in a configuration approximating a circle in the loading position of the rack and for moving certain of the pin holders out of said configuration into a position to form a triangle with the remainder thereof in the lowered position of the pin rack, a pin chute disposed above the pin holders for guiding pins thereto, means for indexing the pin rack through successive increments in the loading position thereof about the approximate center of said circle, to bring successive pin holders under said chute, means operated by the pin deposited in the holder under said chute for controlling said indexing means to bring the succeeding holder into pin receiving position under the chute, and means energized by operation of the indexing means for blocking the chute while the pin rack is indexing.

3. The combination in a pin setting machine for bowling alleys of the type having an alley floor, and a pit, of a pin rack disposed over the alley floor movable between an elevated loading position and a lowered position to deposit pins contained therein on the alley floor in a preselected pattern, said pin rack comprising a plurality of pin holders, means for supporting said pin holders in a configuration approximating a circle in the loading position of the rack and for moving certain of the pin holders out of said configuration into a position to form a triangle with the remainder thereof in the lowered position of the pin rack, pin guiding means disposed above the pin holders for guiding pins thereto, means for indexing the pin rack through successive increments in the loading position thereof about the approximate center of said circle, to bring successive pin holders under said pin guiding means, pin grippers associated with each of said holders for retaining pins therein, stop means disposed below the pin rack for arresting movement of a pin deposited from said pin guiding means into a holder, means for moving the pin grippers into an open position for the reception of a pin upon movement of a holder into pin receiving position under said pin guiding means, means engageable by a pin deposited in the pin holder under said pin guiding means for controlling said indexing means to bring the loaded holder out of pin receiving position and the succeeding holder into pin receiving position, and means for moving the pin grippers into closed position upon movement of the holder out of pin receiving position to retain the pin in the holder.

4. The combination in a pin setting machine for bowling alleys of the type having an alley floor, and a pit channel of a pin rack disposed over the alley floor movable between an elevated loading position and a lowered position to deposit pins contained therein on the alley floor in a preselected pattern, said pin rack comprising a plurality of pin holders, means for supporting said pin holders in a configuration approximating a circle in the loading position of the rack and for moving certain of the pin holders out of said configuration into a position to form a triangle with the remainder thereof in the lowered position of the pin rack, a chute disposed above the pin holders for guiding pins thereto, means for indexing the pin rack through successive increments in the loading position thereof about the approximate center of said circle, to bring successive pin holders under said chute, pin grippers associated with each of said holders for retaining pins therein, stop means disposed below the pin rack for arresting movement of a pin deposited from said chute into a holder, means for moving the pin grippers into an open position for the reception of a pin upon movement of a holder into pin receiving position under said chute, means on said stop means engageable by a pin deposited thereon for controlling said indexing means to bring the loaded holder out of pin receiving position and the succeeding holder into pin receiving position, means for moving the pin grippers into closed position upon movement of the holder out of pin receiving position to retain the pin in the holder, means for moving the pin rack between said loading and lowered positions, and means for moving said stop means from beneath said pins for movement of the rack to said lowered position.

5. The combination in a pin setting machine for bowling alleys of a pin rack disposed above the alley and having a central supporting shaft, loading means for feeding pins in succession to a loading position above said pin rack, means for rotating said shaft to rotate said pin rack through successive increments to load pins therein from said loading means, and driving means operative on said shaft for moving said rack between an elevated pin loading position and a lower position to deposit the pins held therein on the alley.

6. The combination in a pin setting machine for bowling alleys of a pin rack having a central supporting shaft, means for feeding pins in succession to a loading position above the pin rack, a gear drive operative on said shaft for rotating the pin rack through successive increments to load pins therein from said means, and fluid operated means operative on said shaft for moving the rack between an elevated pin loading position and a lower position to deposit the pins held therein on the alley.

7. The combination in a pin setting machine of a pin rack, loading means for feeding pins in succession to a loading position above said pin rack, means for indexing said pin rack through successive increments to load pins therein from said loading means, control means disposed in the path of the pins entering the rack for controlling said indexing means, means for moving said rack between an elevated pin loading position and a lower position to deposit the pins held therein on the alley, and means operative in response to arrival of the pin rack at starting position for moving said control means out of the path of the pin rack.

8. The combination in a pin setting machine for bowling alleys of a pin rack disposed over the alley movable up and down between an elevated loading position and a lowered position adjacent the alley to deposit pins on the alley, said rack including a plurality of pin holders, means for supporting said holders for movement between a configuration approximating a circle in the loading position of the rack and a position forming a triangle in the lowered position thereof, means for rotating said rack through successive increments to bring successive holders to a loading position, pin guiding means for guiding pins into said holders in the loading position, means operated by rotation of said rack to a preselected angularity for controlling the downward movement of the rack to set the pins held therein, and means operated by movement of the pin rack downward for moving the pin holders to the triangular configuration and in response to upward movement of the rack for moving the pin holders to the circular configuration.

9. The combination in a pin setting machine for bowling alleys of a pin rack disposed over the alley movable up and down between an elevated loading position and a lowered position to deposit pins on the alley, said rack including a plurality of pin holders, means for supporting said holders in a configuration approximating a circle in the loading position of the rack, means for intermittently rotating said rack through successive increments to bring successive holders to a loading position, pin guiding means for guiding pins into the holders in the loading position, a pin block movable between a closed position to block the passage of pins past the pin guiding means and an open position to permit the passage of pins, means responsive to rotation of the pin rack to move the pin block to closed position to prevent passage of a pin while the pin rack is rotating, and means operated by rotation of said rack to a preselected angularity for controlling the downward movement of the rack to set the pins held therein.

10. The combination in a pin setting machine for bowling alleys of a pin rack disposed over the alley for receiving and setting the pins on the alley, means for moving said rack up and down between an elevated loading position and a lowered position with the pins substantially in contact with the alley, said rack including a plurality of open ended pin holders for receiving and accumulating the pins preparatory to setting, pin guiding means disposed above the pin rack for guiding the pins into the upper end of the holders and defining a loading position, driving means including an electrically operated once around clutch geared to said pin rack to rotate the same successively through a preselected angularity in response to successive actuations of the clutch and thereby bring succeeding holders into loading position for the reception of a pin, and an electric switch positioned adjacent the lower end of the holders in the loading position thereof to be operated by the pins upon movement into the pin holders to operate the clutch.

11. The combination in a pin setting machine for bowling alleys of pin rack disposed over the alley for receiving and setting the pins on the alley, said rack including a plurality of pin holders for receiving and accumulating the pins preparatory for setting, pin guiding means disposed above the pin rack for guiding the pins into the holders and defining a loading position, means for intermittently driving the pin rack to bring succeeding holders into the loading position for the reception of a pin, means operated by the pins upon movement into the pin holders for controlling the driving means, and means operated in response to movement of the pin rack for blocking the passage of a pin through the pin guide during movement of the rack.

12. The combination in a pin setting machine for bowling alleys of a pin rack disposed over the alley, means for moving said rack up and down between an elevated loading position and a lowered position with the pins substantially in contact with the alley to deposit pins on the alley, said rack including a plurality of open ended pin holders positioned in a configuration approximating a circle in the loading position of the rack, pin guiding means disposed above the pin rack for guiding pins successively into the upper end of said holders and defining a pin loading position, stop means disposed in spaced relation to the lower ends of the holders for defining the loaded position of the pins and, initiating means associated with the stop means operated by the pins in response to movement thereof to the loaded position in the pin holders for initiating rotation of the pin rack to bring successive holders into the loading position, means operated in response to rotation of the pin rack through a preselected angularity for terminating the operation of the last mentioned means and means for moving said stop means out from beneath the pin rack upon downward movement of the latter.

13. The combination in a pin setting machine for bowling alleys of a pin rack disposed over the alley movable up and down between an elevated loading position and a lowered position to deposit pins on the alley, said rack having a plurality of pin holders for receiving the pins preparatory to setting driving means for moving said rack horizontally to bring successive holders to a loading position for the reception of pins, means disposed below the pin rack positioned for engagement of the pins to control the driving means and bring a succeeding holder into loading position, means operated by movement of the rack horizontally to a preselected position for moving the last mentioned means from below the pin rack, and means operated by movement of the rack horizontally to a preselected position for controlling the downward movement of the rack.

14. The combination in a pin setting machine of a pin rack having a plurality of pin holders adapted for receiving pins and depositing same on the alley, a vertically disposed shaft for supporting said rack, a piston secured to said shaft above said rack and in spaced relation thereto, a fluid cylinder enclosing said piston having a bearing for the passage of said shaft, the bearing and piston acting to maintain said shaft against lateral displacement, means for admitting fluid under pressure into said cylinder to raise the rack to an elevated position and for exhausting fluid from said cylinder to lower the rack to a lower position to deposit pins on the alley, and means operative on said shaft to rotate the rack to distribute pins therein.

15. The combination in a pin setting machine of a pin rack having a plurality of pin holders adapted for receiving pins and depositing the same on the alley, a vertically disposed shaft for supporting said rack, a piston secured to said shaft above said rack and in spaced relation thereto, means for admitting fluid under pressure into said cylinder to raise the rack to an elevated position and for exhausting fluid therefrom to lower the rack to deposit pins on the alley, a worm gear on said shaft between the piston and the rack, the shaft being slidable therethrough, a worm for driving said worm gear to rotate said rack and a once around motor driven clutch successively engageable to index said rack to bring successive pin holders into a pin receiving position.

16. The combination in a pin setting machine of a pin rack, means supporting the pin rack above an alley, means for moving the pin rack between an elevated position and a lowered position with the pins substantially in contact with the alley, said rack comprising a plurality of pin holders, means for supporting the pin holders in a configuration approximating a circle in the elevated position of the rack to receive pins into the upper end thereof from a fixed point upon rotation of the rack, pin retaining means associated with each of said holders actuatable between an open position for receiving the pin and a position for retaining the pins in the holders, means for moving pin holders and associated retaining means from said circular configuration to a preselected triangular configuration when the rack is moved to said lower position, and means for actuating said retaining means to selectively move the same into or out of engagement with pins when the rack is moved to the lower position for movement of pins into or out of position in the lower end of the holders.

17. The combination in a pin setting machine of a pin rack comprising a plurality of pin holders arranged annularly thereof each adapted for the reception of a pin, a pin grip associated with each of the pin holders for retaining a pin therein, means for indexing the pin rack to bring successive holders to a pin receiving station, means operated by a pin deposited in a holder for controlling the indexing means to bring the succeeding holder to the pin receiving station, and means for opening the pin grip of each holder in response to movement of the holder to the pin receiving station and for closing the pin grip thereof in response to movement of the holder out of the pin receiving station.

18. The combination in a pin setting machine of a pin rack having an elevated position and a lowered position and comprising a plurality of pin holders, means for indexing the pin rack to bring successive holders to a pin receiving station for the reception of a pin therein, a pin grip associated with each of the pin holders for retaining a pin therein, means for opening the pin grip of each holder in response to movement of the holder to the pin receiving station and for closing the pin grip thereof in response to movement of the holder out of the pin receiving station, and means for opening all of the pin grips when the rack occupies the lower positions to release the pins on the alley.

19. The combination in a pin setting machine of a pin rack having an elevated position and a lowered position and comprising a plurality of pin holders, means for indexing the pin rack to bring successive holders to a pin receiving station for the reception of a pin therein, a pin grip associated with each of the pin holders for retaining a pin therein, means for opening the pin grip of each holder in response to movement of the holder to the pin receiving station and for closing the pin grip thereof in response to movement of the holder out of the pin receiving station, means for moving the pin rack between the elevated and lowered positions thereof, and means for opening the pin grips upon movement of the rack to one of said positions and closing the pin grips upon movement of the rack to the other of said positions.

20. The combination in a pin setting machine for bowling alleys having an alley floor and a pit of a pin rack disposed over the alley floor mounted for movement between an elevated position and a lowered position with the pins therein substantially on the alley floor, said pin rack comprising a plurality of pin holders and a fluid operated pin gripper associated with each holder, pin loading means disposed above the pin rack for supplying pins thereto, motor-driven worm gears for rotating the pin rack in successive increments in the loading position thereof to bring successive pin holders into receiving position under said loading means, a valve for actuating the pin gripper of each holder between open and closed positions, means for operating the valve to actuate the pin gripper into open position upon movement of the holder into pin receiving position and to actuate the gripper to closed position upon movement of the holder out of pin receiving position, fluid-operated means for moving the pin rack between said elevated and lowered positions, and a valve for simultaneously actuating all of the pin grippers to open position when the pin rack occupies the lowered position to release the pins.

21. The combination in a pin setting machine for bowling alleys of a pin rack disposed above the alley, loading means disposed above the pit of the alley for feeding pins in succession to a loading position above said pin rack and means for rotating said pin rack through successive increments to load pins therein from said loading means, said pin rack comprising a plurality of pin holders each having a top opening for reception of pins from said loading means and a bottom delivery opening, means for supporting said holders in a pin receiving configuration to receive pins in succession from said loading means into said top openings upon rotation of said rack and means for moving said pin holders from said pin loading configuration to a pin setting configuration to set the pins on the alley through the bottom delivery openings.

22. The combination in a pin setting machine for bowling alleys disposed wholly above the alley of a pin rack above the alley for holding a plurality of pins, means for moving said pin rack between an elevated loading position and a lowered discharge position with the pins therein substantially contacting the alley, said rack comprising a plurality of pin holders having a top opening for the reception of pins and a bottom delivery opening, means for supporting said pin holders in a configuration approximating a circle in the loading position of the rack to receive pins in succession from a fixed point upon rotation of the rack, and means for moving certain of said pin holders out of said circular configuration into a position to form a preselected triangular configuration with the remainder of said holders when the rack is moved to said discharge position with the pins contacting the alley.

23. The combination in a pin setting machine for bowling alleys of a pin rack disposed over the alley for holding a plurality of pins, means for moving the rack between an elevated loading position and a lowered position to bring the pins contained therein onto the alley in a preselected pattern, said pin rack comprising a horizontally disposed pin frame and a plurality of pin holders each having a top opening for receiving a pin and a bottom discharge opening, means for supporting said holders for movement between a configuration approximating a circle in the loading position of the rack and a position forming a triangle in the lowered position of the rack, and means operated in response to movement of the rack out of the loading position and downwardly to said lowered position for moving the pin holders horizontally in substantial parallelism with the frame to the triangular configuration and operated in response to upward movement of the rack into the loading position to move the pin holders back to the circular configuration.

24. The combination in a pin setting machine for bowling alleys of the type having an alley floor, and a pit, of a pin rack disposed over the alley floor movable between an elevated loading position and a lowered position to deposit pins contained therein on the alley floor in a preselected pattern, said pin rack comprising a plurality of pin holders, means disposed above the pin holders for guiding pins thereto, means for indexing the pin rack through successive increments in the loading position thereof to bring successive pin holders under said guiding means, pin grippers associated with each of said holders for retaining pins therein, means for moving the pin grippers between open and closed positions, means for operating the last mentioned means upon movement of a holder into pin receiving position under said guiding means to open the pin grippers, and for moving the pin grippers into closed position upon movement of the holder out of pin receiving position to retain the pin in the holder.

25. The combination in a pin setting machine for bowling alleys of a pin rack disposed over the alley for holding a plurality of pins, means for moving the rack up and down between an elevated loading position and a lowered position with the pins therein substantially in contact with the alley, said rack including a plurality of pin holders, means for intermittently rotating said rack through successive increments to bring successive holders to a loading position, pin guiding means for guiding pins into the holders in the loading position, a pin block movable between a closed position to block the passage of pins past the pin guiding means and an open position to permit the passage of pins, means responsive to rotation of the pin rack to move the pin block to closed position to prevent passage of a pin while the pin rack is rotating, and means operated by rotation of said rack to a preselected angularity for controlling the downward movement of the rack to set the pins held therein.

26. The combination in a pin setting machine for bowling alleys of a pin rack disposed over the alley for accumulating and simultaneously setting all of the accumulated pins on the alley, said rack including a plurality of pin holders open at both ends for the passage of pins through the holders, said holders receiving and accumulating the pins preparatory to setting, pin guiding means disposed above the pin rack for guiding the pins in succession butt first into the top openings of the holders and defining a loading position, means for intermittently driving the pin rack to bring succeeding holders into the loading position for the reception of a pin, means for gripping the sides of successive pins as they are received in the holders to retain the pins against passage completely through the holders, and means operated by each pin upon movement into a pin holder for controlling the gripping means thereof to effect gripping of the pins and for controlling the driving means to bring the loaded pin holder out of loading position and a succeeding holder into loading position.

ALLISON M. MacFARLAND.

REFERENCES CITED

The following references are of record in the file of this patent:

UNITED STATES PATENTS

| Number | Name | Date |
| --- | --- | --- |
| 1,292,738 | Estabrook | Jan. 28, 1919 |
| 1,375,835 | Fairchild | Apr. 26, 1921 |
| 1,468,212 | Redfield | Sept. 18, 1923 |
| 1,544,928 | Olsen | July 7, 1925 |
| 1,573,643 | Proch | Feb. 16, 1926 |
| 1,692,796 | Bishop | Nov. 20, 1928 |
| 1,712,186 | White | May 7, 1929 |
| 1,896,383 | White | Feb. 7, 1933 |
| 1,911,436 | Cone | May 30, 1933 |
| 2,017,143 | Bentz | Oct. 15, 1935 |
| 2,208,605 | Schmidt | July 23, 1940 |
| 2,310,218 | Davis | Feb. 9, 1943 |
| 2,319,925 | Flanagan | May 25, 1943 |
| 2,341,475 | Parra et al. | Feb. 8, 1944 |
| 2,341,476 | Parra et al. | Feb. 8, 1944 |
| 2,388,708 | Bates | Nov. 13, 1945 |